United States Patent
Oyama et al.

(10) Patent No.: US 9,763,121 B2
(45) Date of Patent: Sep. 12, 2017

(54) COMMUNICATIONS APPARATUS, MOBILE COMMUNICATIONS APPARATUS, COMMUNICATIONS SYSTEM, AND COMMUNICATION METHOD

(71) Applicant: FUJITSU LIMITED, Kawasaki-shi, Kanagawa (JP)

(72) Inventors: Teppei Oyama, Kawasaki (JP); Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/305,180

(22) Filed: Jun. 16, 2014

(65) Prior Publication Data

US 2014/0295863 A1    Oct. 2, 2014

Related U.S. Application Data

(63) Continuation of application No. PCT/JP2012/050286, filed on Jan. 10, 2012.

(51) Int. Cl.
| | |
|---|---|
| *H04W 40/00* | (2009.01) |
| *H04W 24/08* | (2009.01) |
| *H04W 16/14* | (2009.01) |
| *H04W 48/16* | (2009.01) |

(52) U.S. Cl.
CPC .......... *H04W 24/08* (2013.01); *H04W 16/14* (2013.01); *H04W 48/16* (2013.01)

(58) Field of Classification Search
CPC . H04W 16/10; H04W 72/0453; H04W 72/04; H04L 5/0069

(Continued)

(56) References Cited

U.S. PATENT DOCUMENTS

| | | | |
|---|---|---|---|
| 6,418,317 B1* | 7/2002 | Cuffaro | H04W 16/10 |
| | | | 455/450 |
| 2005/0101331 A1* | 5/2005 | Tamaki | H04W 64/00 |
| | | | 455/456.1 |

(Continued)

FOREIGN PATENT DOCUMENTS

| | | |
|---|---|---|
| JP | 2004-005339 A | 1/2004 |
| JP | 2007-184850 A | 7/2007 |

(Continued)

OTHER PUBLICATIONS

Notice of Preliminary Rejection issued for corresponding Korean Patent Application No. 10-2014-7018460 mailed on Jul. 31, 2015 with a partial English translation.

(Continued)

*Primary Examiner* — Olumide T Ajibade Akonai
*Assistant Examiner* — Edward Zhang
(74) *Attorney, Agent, or Firm* — Myers Wolin, LLC

(57) ABSTRACT

A communications apparatus includes a processor configured to identify positions where wireless communication with a mobile communications apparatus is possible, the positions being included in a coverage area of the communications apparatus; and obtain from a database that is inaccessible to the mobile communications apparatus, frequency information that indicates frequencies that can be used for the wireless communication at the identified positions; and an announcing unit configured to announce in the coverage area and by a radio signal, correspondence information that is based on the frequency information obtained by the obtaining unit and that correlates the positions and the frequencies that can be used.

6 Claims, 31 Drawing Sheets

(58) Field of Classification Search
USPC .............................. 455/456.1, 456.6, 404.2
See application file for complete search history.

(56) References Cited

U.S. PATENT DOCUMENTS

| | | | |
|---|---|---|---|
| 2009/0023469 A1 | 1/2009 | Tomioka et al. | |
| 2009/0303952 A1* | 12/2009 | Hosokawa | H04W 72/085 370/329 |
| 2010/0323694 A1 | 12/2010 | Altintas | |
| 2011/0051640 A1* | 3/2011 | Ramesh | H04W 48/14 370/311 |
| 2011/0195719 A1* | 8/2011 | Chmiel | H04J 11/0069 455/450 |
| 2011/0205979 A1* | 8/2011 | Silk | H04W 72/048 370/329 |
| 2011/0237268 A1* | 9/2011 | Tsuda | H04W 72/0453 455/450 |
| 2012/0184318 A1 | 7/2012 | Lee et al. | |
| 2012/0289274 A1* | 11/2012 | Matsuo | H04W 48/02 455/509 |

FOREIGN PATENT DOCUMENTS

| | | |
|---|---|---|
| JP | 2009-027449 A | 2/2009 |
| JP | 2011-29770 A | 2/2011 |
| JP | 2011-205371 A | 10/2011 |
| JP | 2012-005068 A | 1/2012 |
| WO | 2009/104689 A1 | 8/2009 |
| WO | 2011/106538 A1 | 9/2011 |
| WO | 2011/115449 A2 | 9/2011 |
| WO | 2011/122763 A2 | 10/2011 |

OTHER PUBLICATIONS

Office Action issued for corresponding Japanese Patent Application No. 2013-553126 mailed on May 19, 2015 with a partial English translation.

International Preliminary Report on Patentability issued for corresponding International Patent Application No. PCT/JP2012/050286 mailed on Jul. 24, 2014 with English Translation.

International search report issued for corresponding international application No. PCT/JP2012/050286, mailed Feb. 7, 2012.

Office Action issued for corresponding Japanese Patent Application No. 2013-553126 mailed Sep. 8, 2015 with a partial English translation.

Extended European search report with the supplementary European search report and the European search opinion issued for corresponding European Patent Application No. 12865105.6 dated Nov. 27, 2015.

Murty et al., "SenseLess: A Database Driven White Spaces Network", Microsoft Research Technical Report, MSR-TR-2010-127, pp. 1-21, Sep. 20, 2010.

NICT, "Channel list request/response for multiple geo-locations", vol. 802.11-10/1233r1, pp. 1-10, IEEE-SAMENTOR, Piscataway, NJ (US), Nov. 9, 2010.

NICT, "Channel list request/response for multiple geo-locations", vol. 802.11af-10/1234r2, pp. 1-9, IEEE-SAMENTOR, Piscataway, NJ (US), Nov. 2, 2010.

Notice of Second Preliminary Rejection issued for corresponding Korean Patent Application No. 10-2014-7018460 mailed on Feb. 26, 2016 with a partial English translation.

Office Action issued for corresponding European patent application No. 12865105.6 mailed on Aug. 9, 2016.

First Notification of Office Action issued by the State Intellectual Property Office of China for corresponding Chinese Patent Application No. 201280066508.0, dated Mar. 3, 2017, with an English translation.

Invitation pursuant to Article 94(3) and Rule 71(1) EPC issued by the European Patent Office for corresponding European Patent Application No. 12 865 105.6-1505, dated Jul. 20, 2017.

* cited by examiner

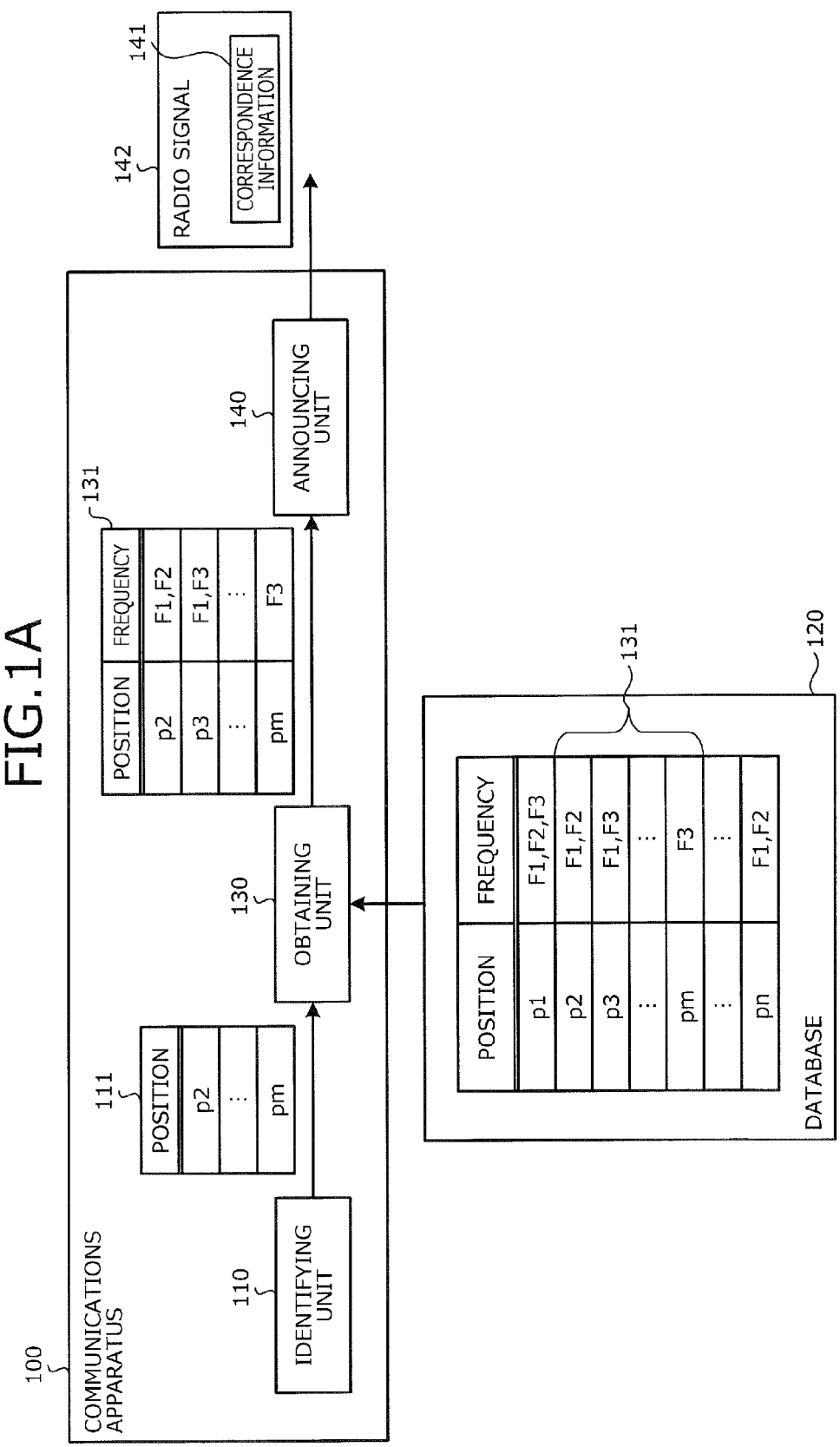

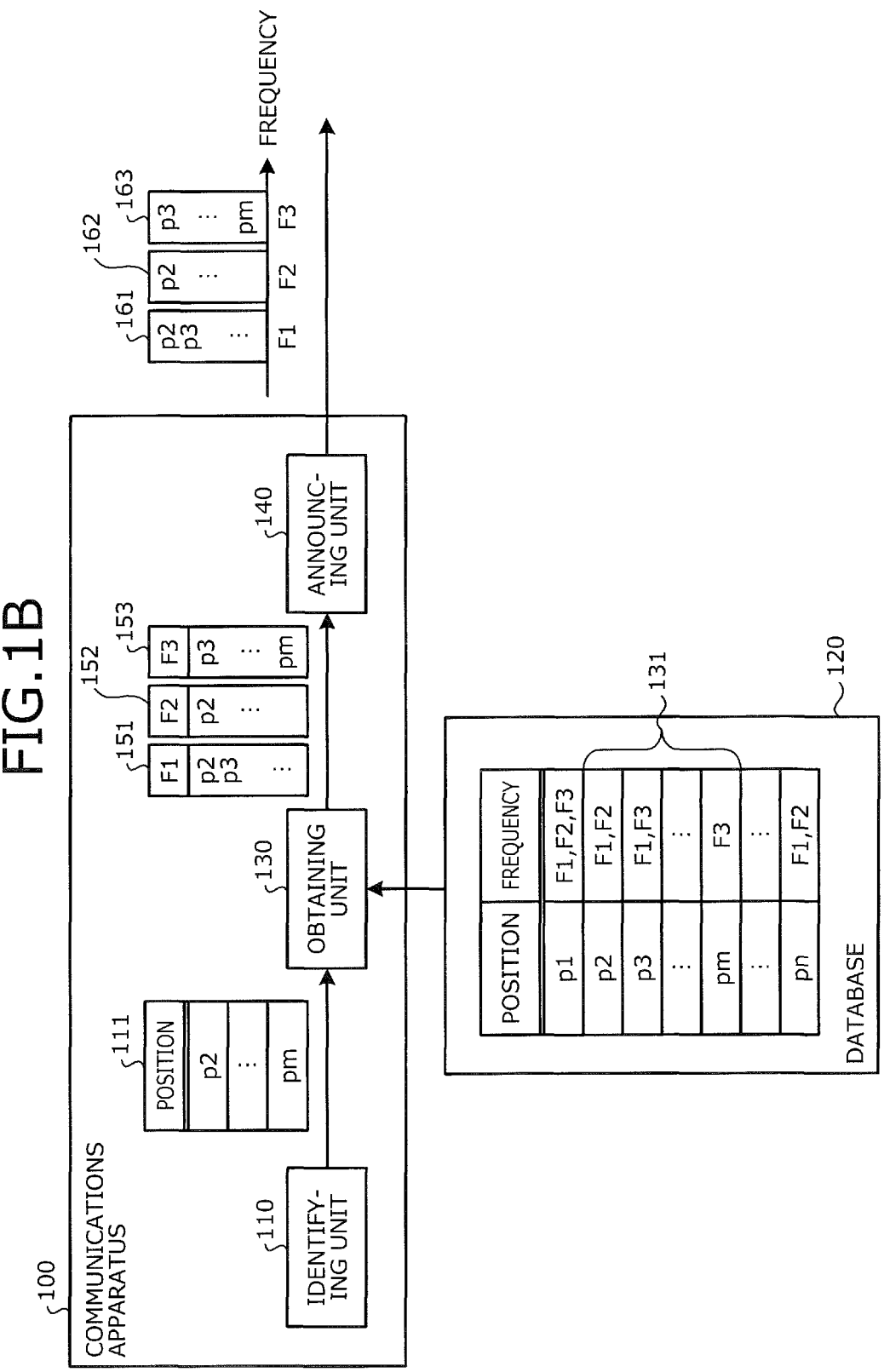

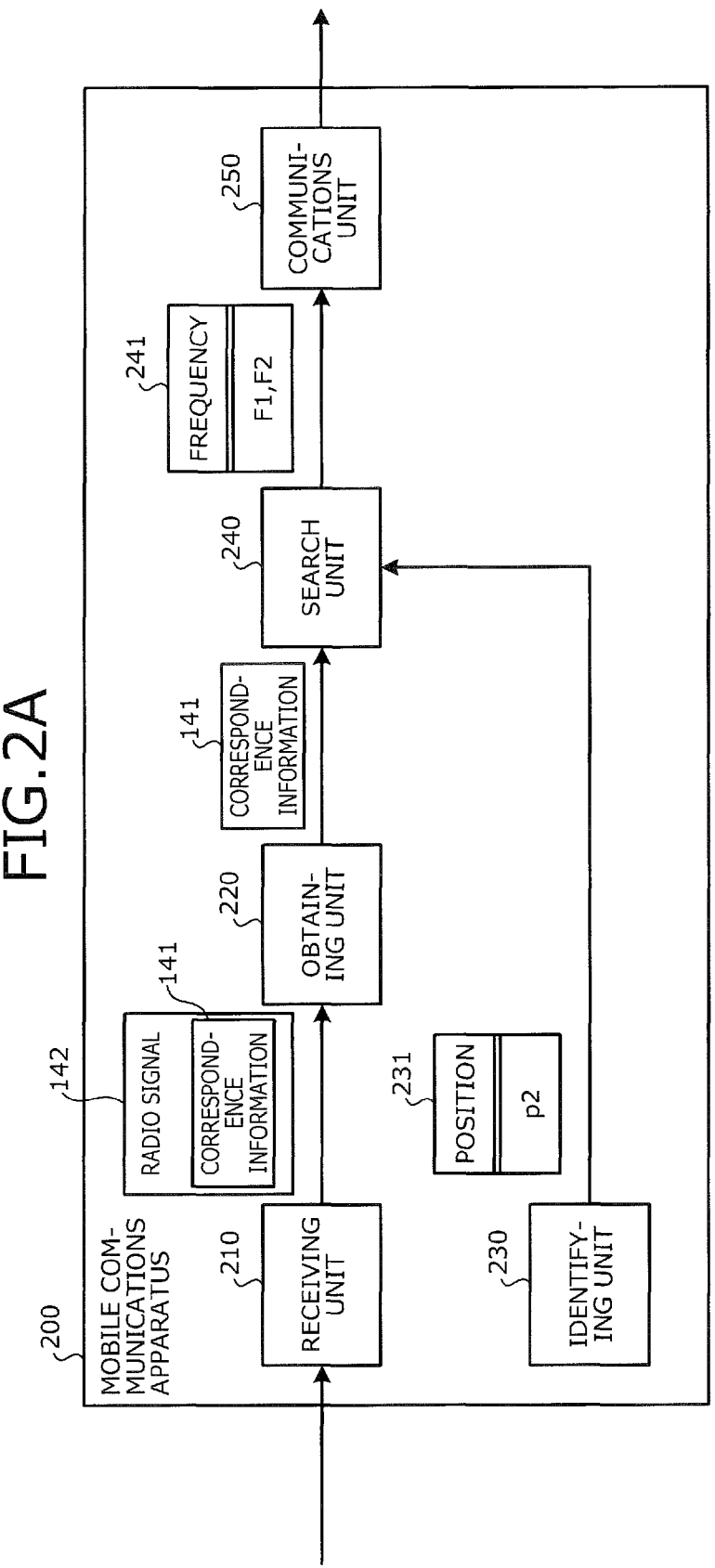

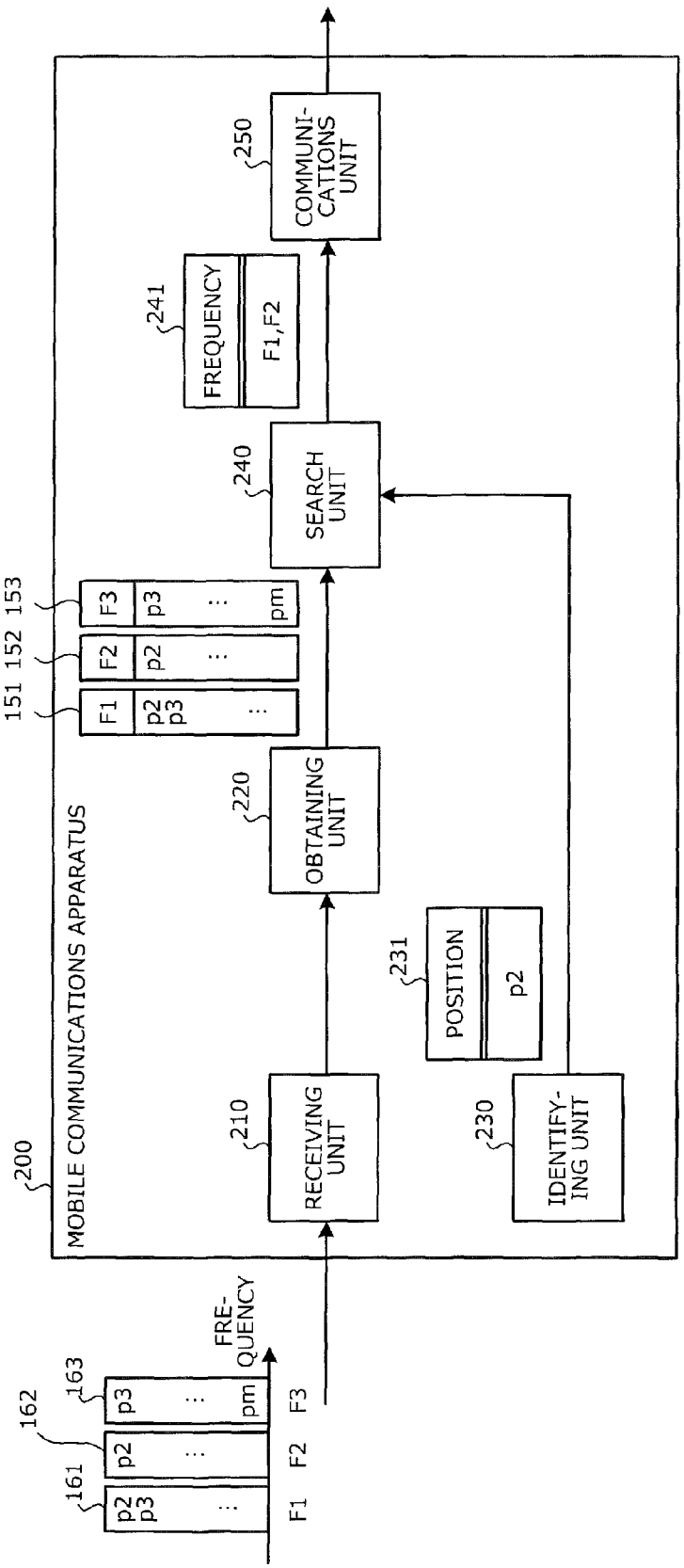

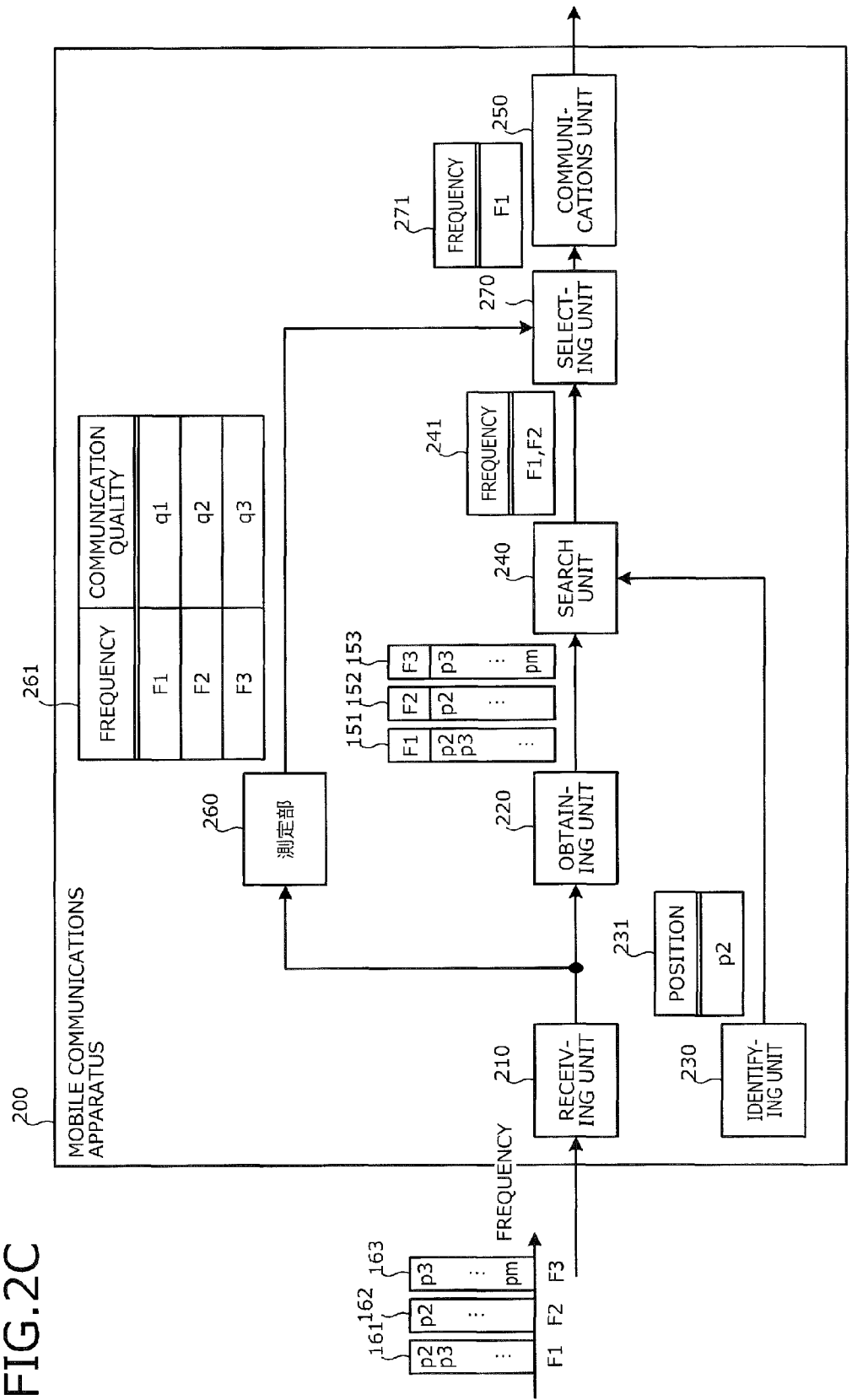

701: FREQUENCIES f1, f2, ..., fn THAT CAN BE USED AT POINT (i, j)

701:
FREQUENCY: f1
LATITUDE/LONGITUDE
xx.xxxx / xx.xxxx
xx.xxxx / xx.xxxx
⋮
xx.xxxx / xx.xxxx

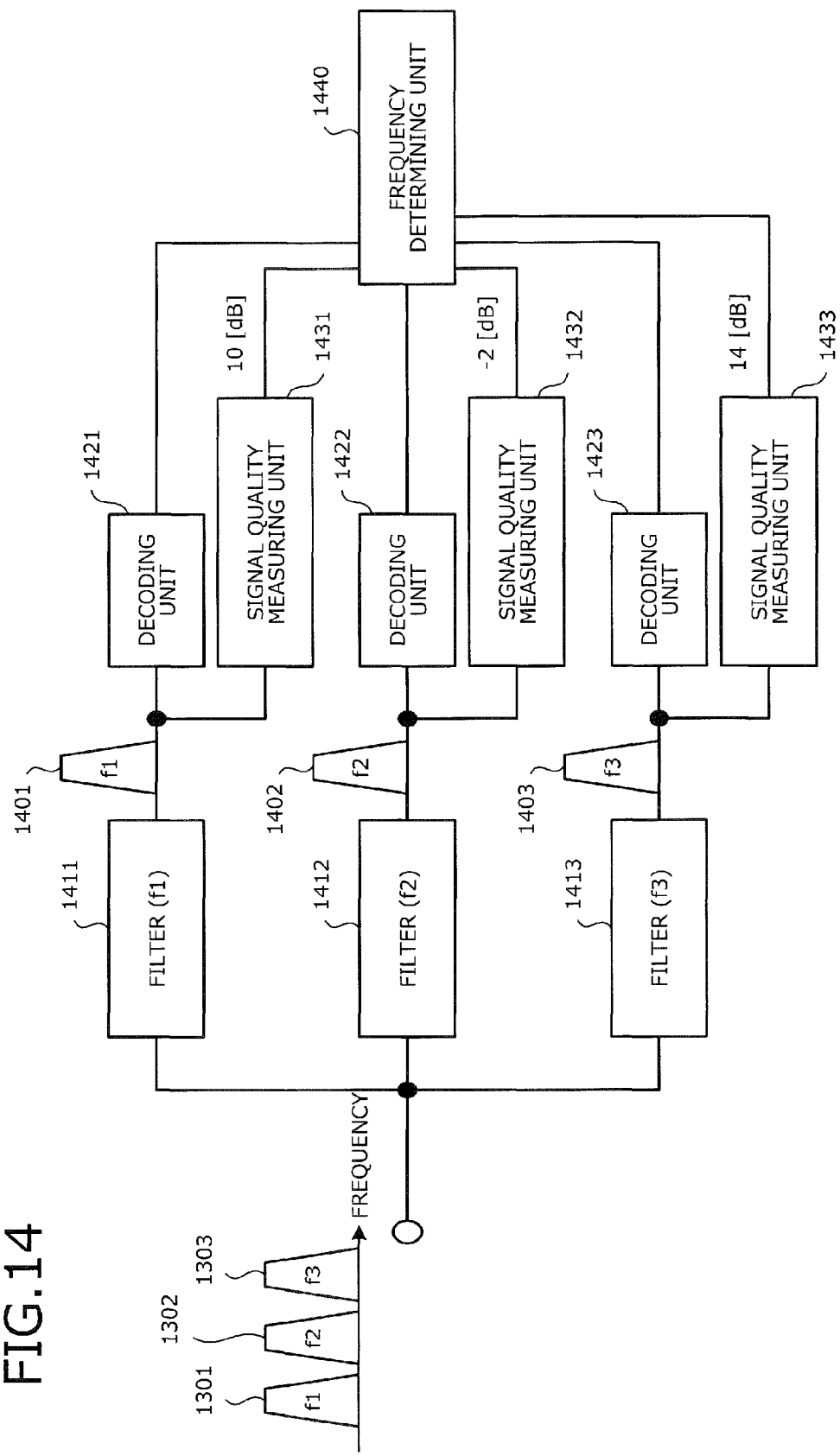

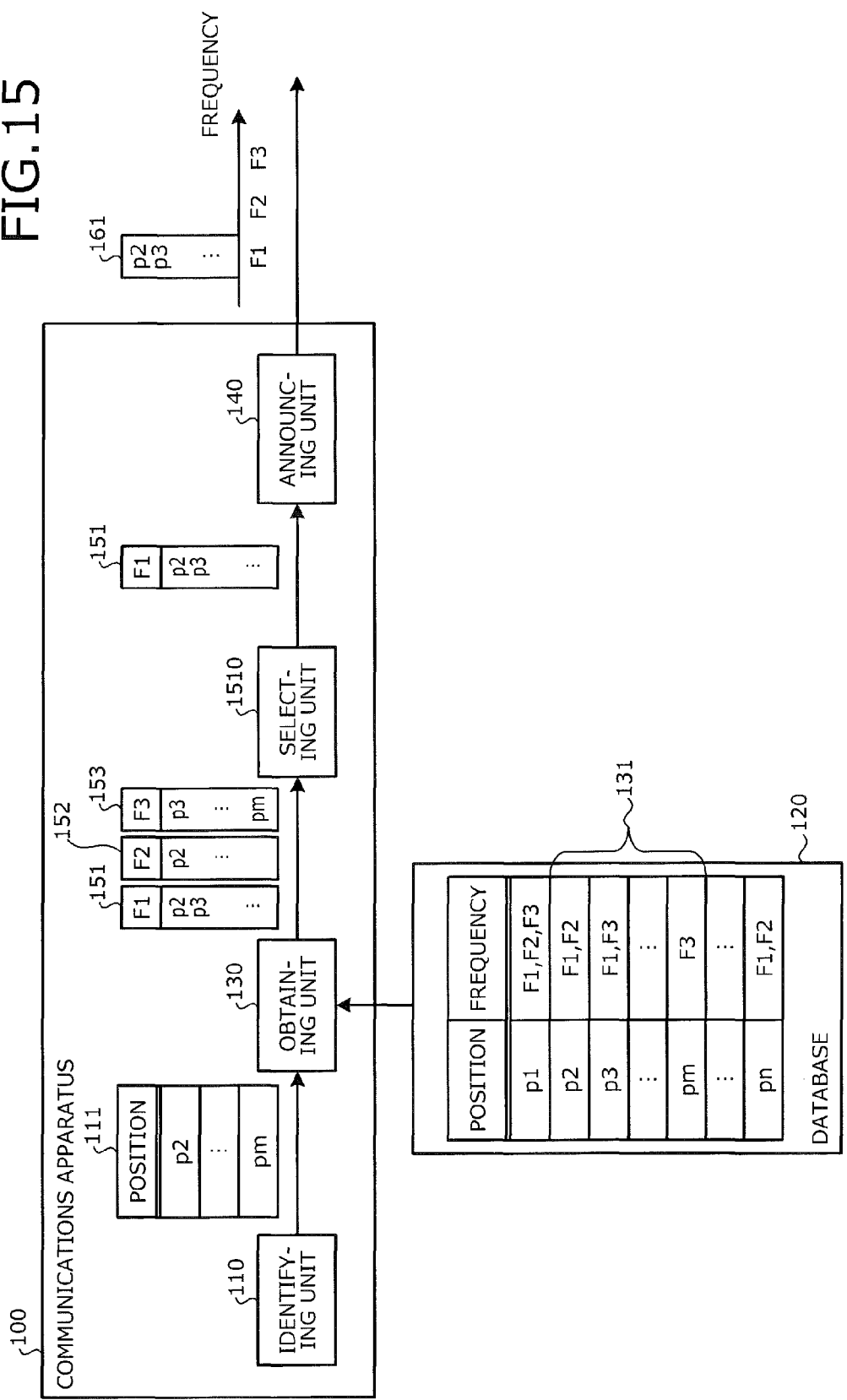

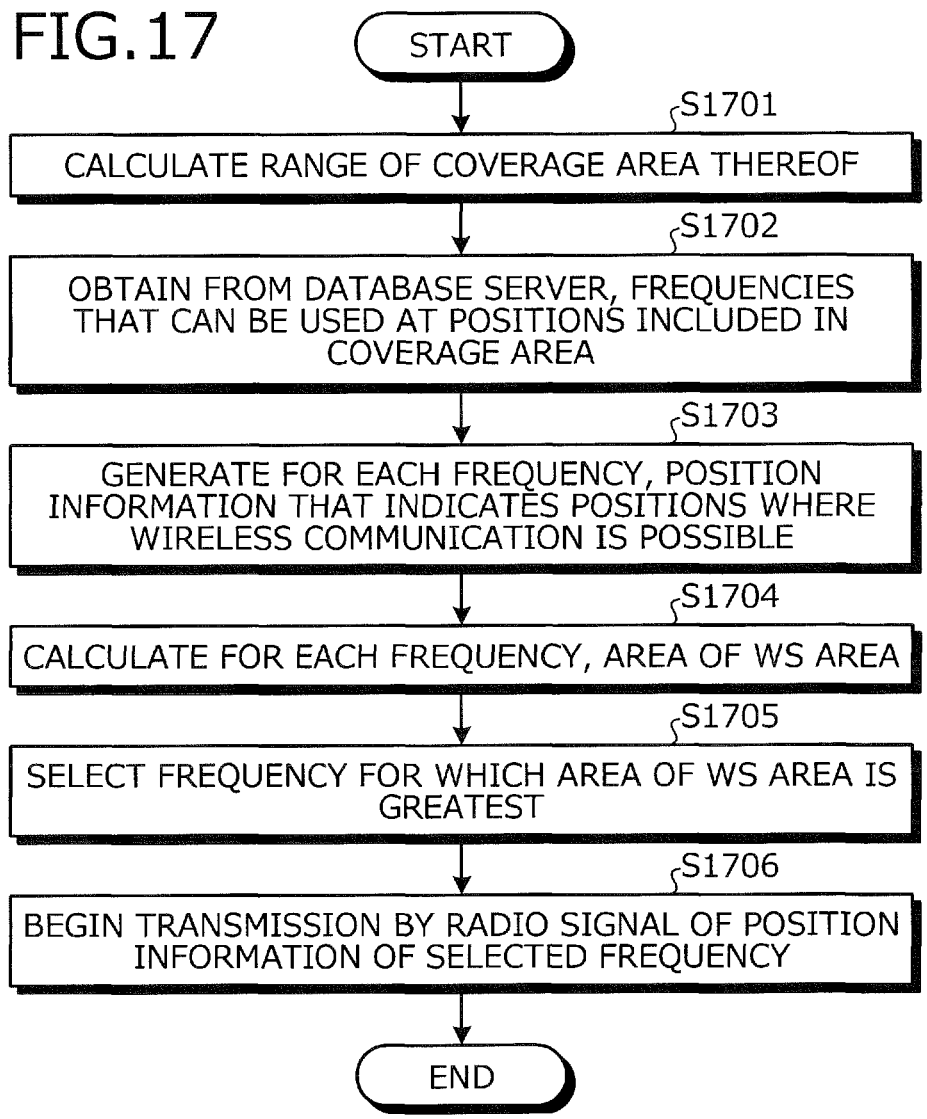

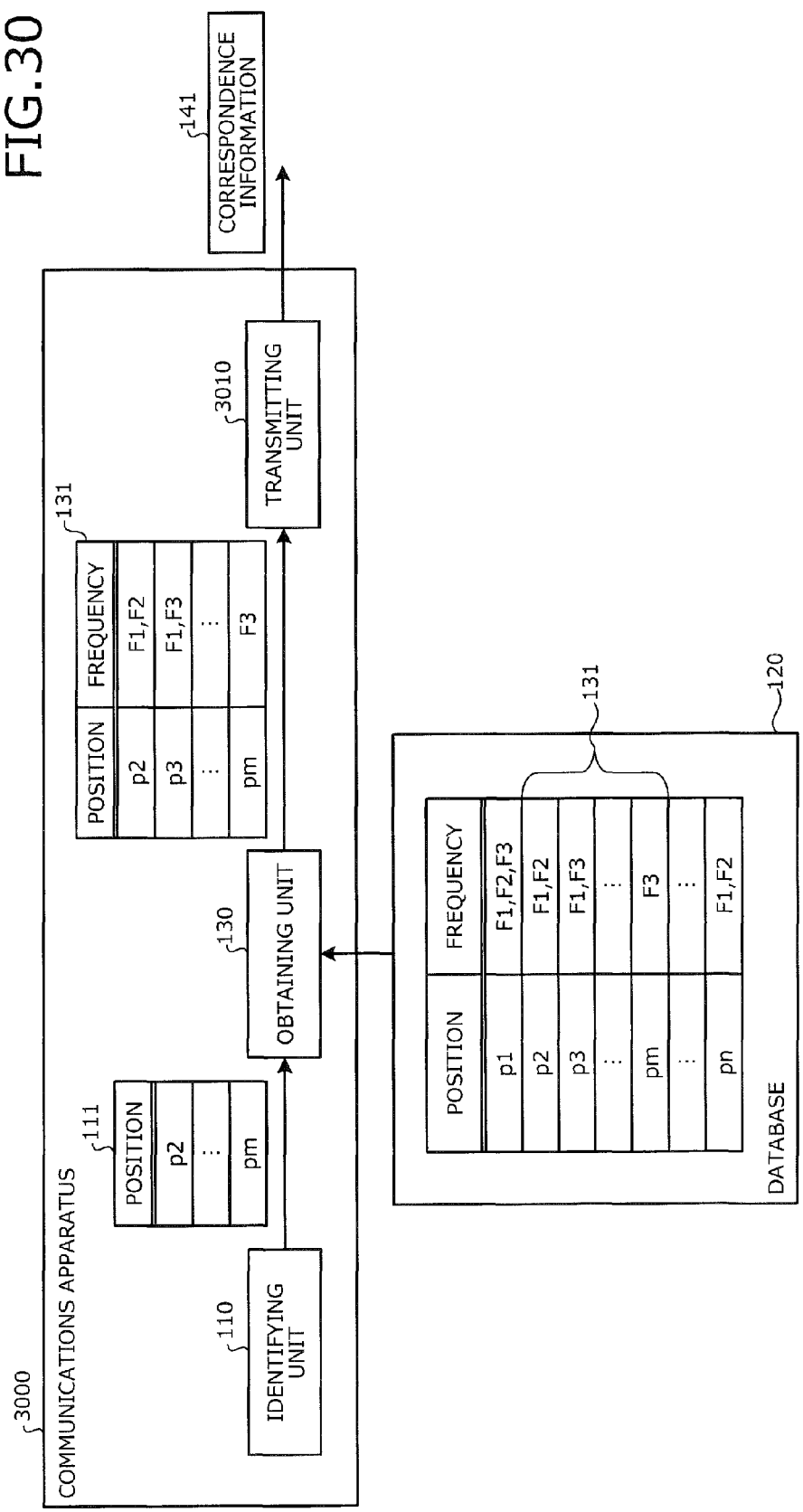

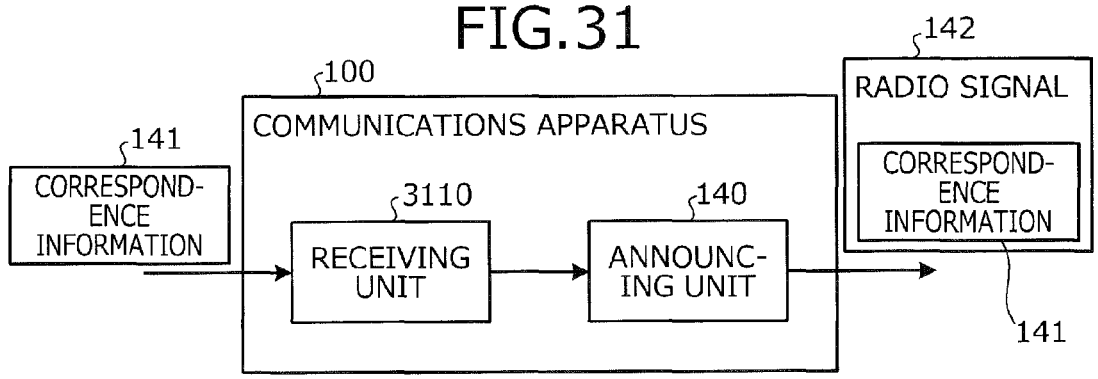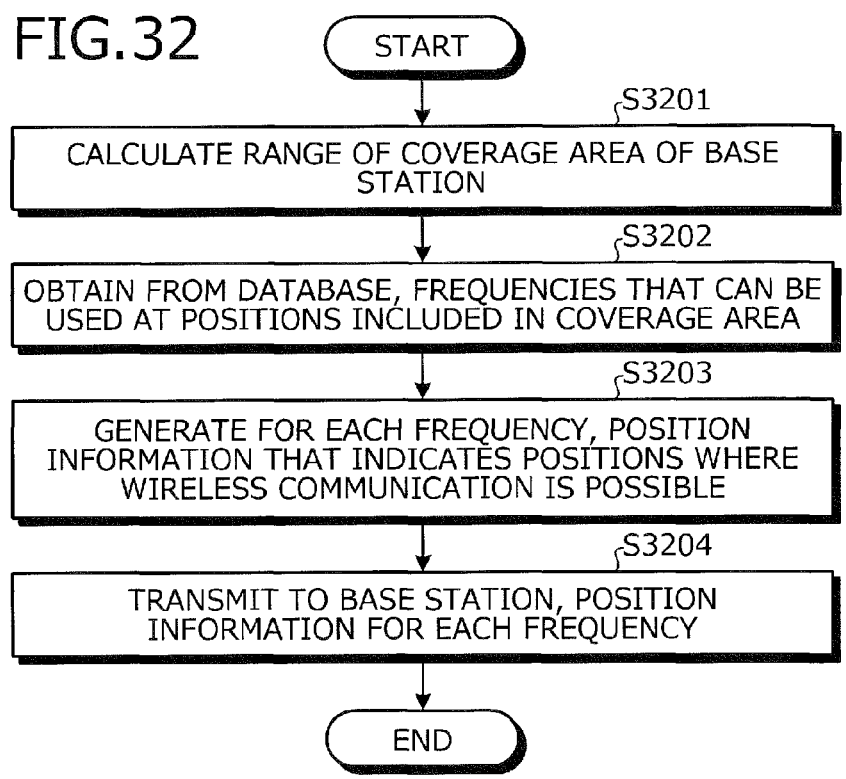

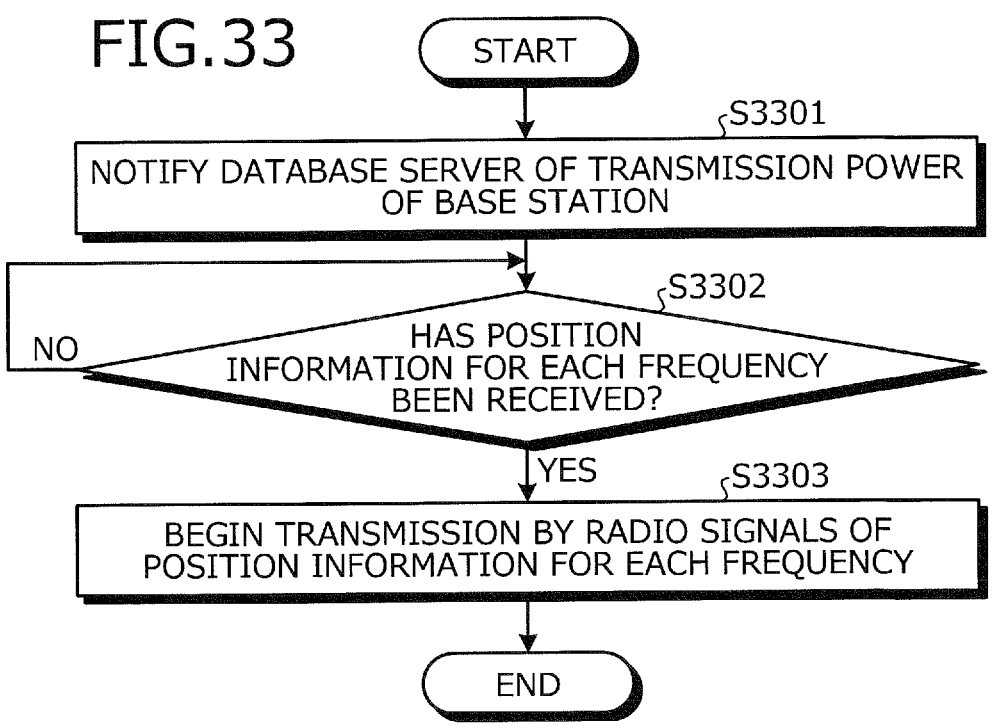

COMMUNICATIONS APPARATUS, MOBILE COMMUNICATIONS APPARATUS, COMMUNICATIONS SYSTEM, AND COMMUNICATION METHOD

CROSS-REFERENCE TO RELATED APPLICATIONS

This application is a continuation application of International Application PCT/JP2012/050286, filed on Jan. 10, 2012 and designating the U.S., the entire contents of which are incorporated herein by reference.

FIELD

The embodiments discussed herein are related to a communications apparatus, a mobile communications apparatus, a communications system, and a communication method.

BACKGROUND

Wireless traffic continues to rapidly increase accompanied by continual increases in demand for frequency, a limited resource. Research related to cognitive radio technology that performs optimal communication by recognizing the local radio environment has been advancing as one way of effectively using frequency. For example, a function that finds frequency white space that corresponds to a time and location such that interference in a system capable of preferentially using frequency does not occur is known as white space (WS) type (or, frequency sharing type) cognitive radio. For example, in the United States of America, use of TV white space (TVWS) communication is under investigation.

With white space type cognitive radio, for example, a system that finds white space and a primary system (or a 1° system), which is a system having privilege to use frequency, is called a secondary system (or a 2° system). In the case of TVWS, a TV broadcast is a primary system.

In a TV broadcast, a wide frequency range is assigned by an ultra-high frequency (UHF) band, etc., whereby not only does the frequency (physical TV channel) used differ according to region, but variations in terms of time are few. Sensing methods and database access methods are present as methods of finding such quasi-static TVWS. For example, even under the rules announced by the Federal Communications Commission (FCC), provisions are given concerning sensing methods and database access methods.

In a database access method, for example, a secondary system accesses a database on a network and obtains WS information that indicates white space. The database, for example, correlates with position information, the WS information that has been calculated using the positions of TV broadcast transmission stations, transmission power, transmission frequency, and other such information. The FCC rules prescribe that a secondary system that uses a database access method is to access a database at least one or more times per day.

On the other hand, according to a known technique for cognitive radio, the frequency to be used by a radio terminal is determined from parameters required for communication, including the available frequency distributed by a database apparatus and the communication distance (for example, refer to Japanese Laid-Open Patent Publication No. 2007-184850).

Nonetheless, with the convention techniques above, a mobile communications apparatus that belongs to a secondary system and has no function for accessing a server that provides WS information cannot determine which local frequency is white space. Consequently, the frequency that the mobile communications apparatus can use for radio communication may be restricted to a frequency that can be used throughout the coverage area of the base station, whereby the utilization efficiency of frequency becomes low.

SUMMARY

According to an aspect of an embodiment, a communications apparatus includes a processor configured to identify positions where wireless communication with a mobile communications apparatus is possible, the positions being included in a coverage area of the communications apparatus; and obtain from a database that is inaccessible to the mobile communications apparatus, frequency information that indicates frequencies that can be used for the wireless communication at the identified positions; and an announcing unit configured to announce in the coverage area and by a radio signal, correspondence information that is based on the frequency information obtained by the obtaining unit and that correlates the positions and the frequencies that can be used.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram depicting a configuration example of a communications apparatus according to a first embodiment;

FIG. 1B is a diagram depicting another configuration example of the communications apparatus according to the first embodiment;

FIG. 2A is a diagram depicting a configuration example of a mobile communications apparatus according to the first embodiment;

FIG. 2B is a diagram depicting another configuration example of the mobile communications apparatus according to the first embodiment;

FIG. 2C is a diagram depicting another configuration example of the mobile communications apparatus according to the first embodiment;

FIG. 14 is a block diagram depicting an example of a radio signal decoding process by the mobile communications apparatus;

FIG. 15 is a diagram depicting a configuration example of the communications apparatus according to a second embodiment;

FIG. 17 is a flowchart depicting an example of operation of the base station according to the second embodiment;

FIG. 30 is a diagram (part 1) depicting a configuration of the communications apparatus according to a fourth embodiment;

FIG. 31 is a diagram (part 2) depicting a configuration of the communications apparatus according to the fourth embodiment;

FIG. 32 is a flowchart depicting an example of operation of the database server according to the fourth embodiment; and FIG. 33 is a flowchart depicting an example of operation by a base station 320 according to the fourth embodiment.

DESCRIPTION OF EMBODIMENTS

Figure 3:
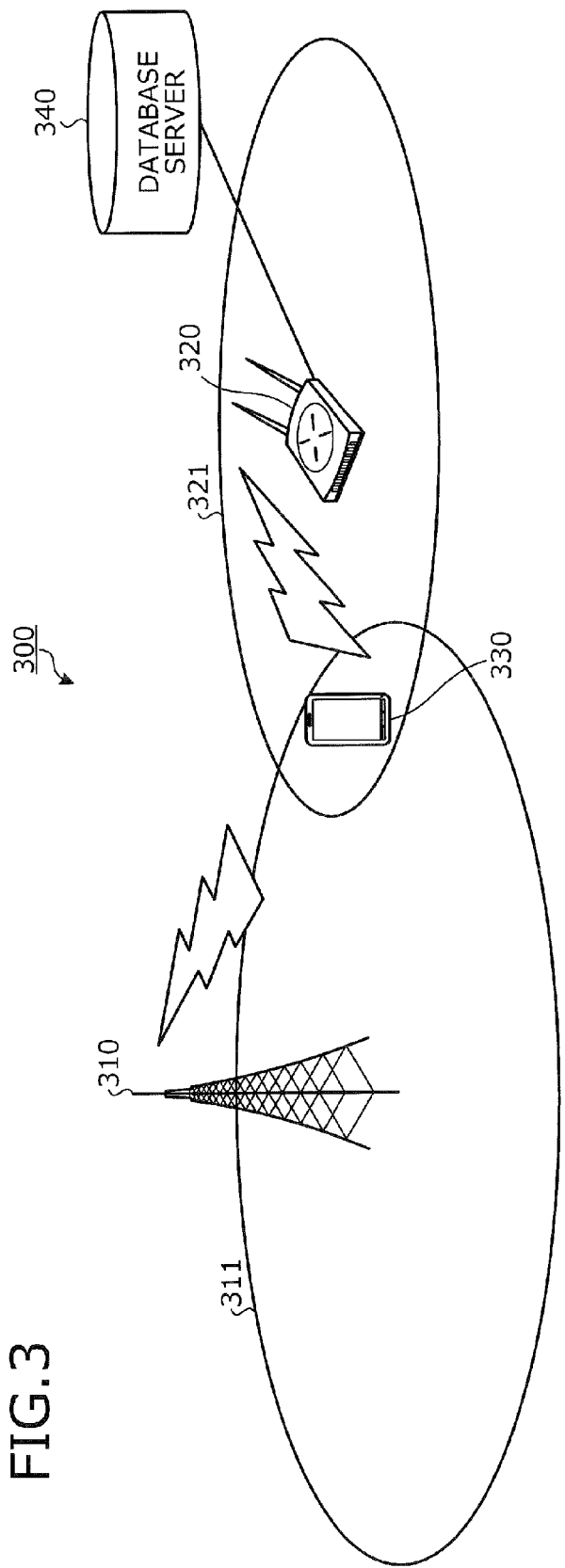
FIG. 3 is a diagram depicting an example of a communications system according to the first embodiment.

Embodiments of a communications apparatus, a mobile communications apparatus, a communications system, and a communication method will be described in detail with reference to the accompanying drawings.

FIG. 1A is a diagram depicting a configuration example of a communications apparatus according to the first embodiment. A communications apparatus 100 depicted in FIG. 1A is a wireless communications apparatus configured to wirelessly communicate with a mobile communications apparatus that is in the coverage area of the communications apparatus 100. The communications apparatus 100, for example, is a base station that wirelessly communicates with a mobile communications apparatus. Alternatively, the communications apparatus 100 may be a mobile communications apparatus that wirelessly communicates (e.g., performs wireless ad hoc communication) with other mobile communications apparatuses.

As depicted in FIG. 1A, the communications apparatus 100 includes an identifying unit 110, an obtaining unit 130, and an announcing unit 140. The identifying unit 110 identifies positions included in the coverage area of the communications apparatus 100. For example, the memory of the communications apparatus 100 stores coverage area information that indicates the range of the coverage area of the communications apparatus 100 and the identifying unit 110 reads out the coverage area information stored in the memory and identifies positions included in the coverage area.

Further, the identifying unit 110 may receive the coverage area information, which indicates the range of the coverage area of the communications apparatus 100, from another communications apparatus to thereby identify positions included in the coverage area. The identifying unit 110 may identify positions included in the coverage area by calculating the range of the coverage area of the communications apparatus 100, based on the strength of a radio signal transmitted by the communications apparatus 100.

The identifying unit 110 notifies the obtaining unit 130 of the identified positions. In the example depicted in FIG. 1A, the identifying unit 110 is assumed to identify positions p2, ..., pm (where, m is a natural number) as positions included in the coverage area of the communications apparatus 100. In this case, the identifying unit 110 outputs to the obtaining unit 130, position information 111 that indicates positions p2, ..., pm.

A database 120 is a database that includes information that indicates for each position p1, ..., pm, ..., pn (where, n is a natural number greater than m), a frequency that can be used for wireless communication between the communications apparatus 100 and a mobile communications apparatus. Positions p1, ..., pm, ..., pn include positions p2, ..., pm that are included in the coverage area of the communications apparatus 100. The database 120 may be a database stored in the memory of an apparatus (e.g., a server) external to the communications apparatus 100. The database 120 may be a database stored in the memory of the communications apparatus 100.

The obtaining unit 130 obtains from the database 120, frequency information that indicates frequencies that can be used for wireless communication with mobile communications apparatuses located at the positions indicated by the position information 111 output from the identifying unit 110. For example, if the database 120 is stored in the memory of the communications apparatus 100, the obtaining unit 130 reads out the frequency information from the database 120 stored in the memory. Further, if the database 120 is stored in the memory of an apparatus external to the communications apparatus 100, the obtaining unit 130 receives the frequency information from the external apparatus.

In the example depicted in FIG. 1A, the obtaining unit 130 is notified of positions p2, . . . , pm by the identifying unit 110. Consequently, among the frequency information related to positions p1, . . . , pm, . . . , pn, the obtaining unit 130 obtains from the database 120, frequency information 131 that is related to positions p2, . . . , pm.

The obtaining unit 130 outputs the obtained frequency information 131 to the announcing unit 140. In the frequency information 131, frequencies F1 and F2 are correlated with position p2. Further, in the frequency information 131, frequencies F1 and F3 are correlated with position p3, and frequency F3 is correlated with position pm.

The announcing unit 140 uses a radio signal 142 to announce in the coverage area of the communications apparatus 100, correspondence information 141 that is based on the frequency information 131 output from the obtaining unit 130 and correlates positions p2, . . . , pm and available frequencies. The correspondence information 141 is, for example, information that indicates for each position p2, . . . , pm, a frequency that can be used for wireless communication between the communications apparatus 100 and a mobile communications apparatus. Further, the correspondence information 141 may indicate for each frequency, positions p2, . . . , pm at which wireless communication between the communications apparatus 100 and a mobile communications apparatus is possible.

The communications apparatus 100 includes a communications unit that performs wireless communication with a mobile communications apparatus. The communications unit of the communications apparatus 100 performs wireless communication with a mobile communications apparatus, by using a frequency that has been selected by the mobile communications apparatus, based on the correspondence information 141 announced by the announcing unit 140.

Thus, the communications apparatus 100 obtains from the database 120 and announces in the coverage area, the frequencies that can be used at positions within the coverage area, whereby a mobile communications apparatus within the coverage area can identify a frequency that can be used by the mobile communications apparatus. Consequently, compared to a case where, for example, a mobile communications apparatus cannot identify a frequency that can be used by the mobile communications apparatus and performs wireless communication using a frequency that can be used throughout the coverage area of the communications apparatus 100, the utilization efficiency of frequency can be improved.

FIG. 1B is a diagram depicting another configuration example of the communications apparatus according to the first embodiment. In FIG. 1B, parts identical to those depicted in FIG. 1A are given the same reference numerals used in FIG. 1A and description thereof is omitted. As depicted in FIG. 1B, the obtaining unit 130 obtains for each frequency that can be used for wireless communication and based on information in the database 120, position information that indicates positions where wireless communication is possible.

In the example depicted in FIG. 1B, the obtaining unit 130 obtains position information 151 to 153 respectively corresponding to the frequencies F1 to F3 that can be used for wireless communication between the communications apparatus 100 and a mobile communications apparatus. The position information 151 is information that indicates positions p2, p3, . . . at which frequency F1 can be used for wireless communication between the communications apparatus 100 and a mobile communications apparatus. The position information 152 is information that indicates positions p2, . . . at which frequency F2 can be used for wireless communication between the communications apparatus 100 and a mobile communications apparatus. The position information 153 is information that indicates positions p3, . . . , pm at which frequency F3 can be used for wireless communication between the communications apparatus 100 and a mobile communications apparatus. The obtaining unit 130 outputs the position information 151 to 153 to the announcing unit 140.

The announcing unit 140 transmits the position information 151 to 153 output from the obtaining unit 130 using radio signals of each frequency. For example, the announcing unit 140 transmits the position information 151 by a radio signal 161 of frequency F1. The announcing unit 140 transmits the position information 152 by a radio signal 162 of frequency F2 and transmits the position information 153 by a radio signal 163 of frequency F3.

Thus, for each frequency that can be used, the communications apparatus 100 uses a radio signal of the same frequency to announce position information that indicates positions at which wireless communication can be performed using the frequency. Consequently, a mobile communications apparatus receives the radio signal of a candidate frequency that can be used for wireless communication with the communications apparatus 100, whereby the mobile communications apparatus can obtain position information that indicates positions at which the candidate frequency can be used. As a result, for example, the mobile communications apparatus can more efficiently obtain position information related to a frequency that can be used.

FIG. 2A is a diagram depicting a configuration example of a mobile communications apparatus according to the first embodiment. A mobile communications apparatus 200 depicted in FIG. 2A is mobile communications apparatus that in the coverage area of the communications apparatus 100 depicted in FIGS. 1A and 1B, wirelessly communicates with the communications apparatus 100. Further, the mobile communications apparatus 200 is a mobile communications apparatus without a function of accessing the database 120 depicted in FIGS. 1A and 1B. As depicted in FIG. 2A, the mobile communications apparatus 200 includes a receiving unit 210, an obtaining unit 220, an identifying unit 230, a search unit 240, and a communications unit 250.

The receiving unit 210 receives through a radio signal from the communications apparatus 100, a signal announced to the coverage area of the communications apparatus 100. For example, frequencies F1 to F5 are assumed to be candidate frequencies that can be used between the communications apparatus 100 and the mobile communications apparatus 200. In this case, the receiving unit 210 receives radio signals respectively of frequencies F1 to F5. In the example depicted in FIG. 1A, the receiving unit 210 receives the radio signal 142, which includes the correspondence information 141. The receiving unit 210 outputs the received radio signal 142 to the obtaining unit 220.

The obtaining unit 220 obtains from the radio signal 142 output by the receiving unit 210, the correspondence information 141, which correlates positions included in the coverage area and frequencies that can be used at the positions, for wireless communication with the communications apparatus 100. The obtaining unit 220 outputs the obtained correspondence information 141 to the search unit 240.

The identifying unit 230 identifies the position of the mobile communications apparatus 200 (the apparatus thereof). For example, the identifying unit 230 identifies the position of the mobile communications apparatus 200 by receiving a global positioning system (GPS) signal from a GPS satellite. Alternatively, the identifying unit 230 may identify the position of the mobile communications apparatus 200 by receiving a radio signal from a nearby base station. In the example depicted in FIG. 2A, the position of the mobile communications apparatus 200 is assumed to be identified as position p2. In this case, the identifying unit 230 outputs to the search unit 240, position information 231 that indicates the identified position p2.

The search unit 240 searches the correspondence information 141 output by the obtaining unit 220, for a frequency that corresponds to position p2 indicated by the position information 231 output by the identifying unit 230. In the correspondence information 141, frequencies F1 and F2 are correlated with position p2 (for example, refer to FIG. 1A). The search unit 240 outputs to the communications unit 250, frequency information 241 that indicates the frequencies F1 and F2 obtained from the search.

The communications unit 250 uses any one of the frequencies F1 and F2 indicated by the frequency information 241 output by the search unit 240, to wirelessly communicate with the communications apparatus 100. Consequently, even without a function of accessing the database 120, the mobile communications apparatus 200 can identify a frequency that can be used at the position of the mobile communications apparatus 200 and can use the identified frequency to wirelessly communicate with the communications apparatus 100.

FIG. 2B is a diagram depicting another configuration example of the mobile communications apparatus according to the first embodiment. In FIG. 2B, parts identical to those depicted in FIG. 2A are given the same reference numerals used in FIG. 2A and description thereof is omitted. As depicted in FIG. 2B, the radio signals received by the receiving unit 210 include the radio signals 161 to 163 (refer to FIG. 1B). The receiving unit 210 outputs the received radio signals 161 to 163 to the obtaining unit 220.

The obtaining unit 220 respectively obtains the position information 151 to 153 from the radio signals 161 to 163 output by the receiving unit 210. The obtaining unit 220 outputs the obtained position information 151 to 153 to the search unit 240. The search unit 240 searches the position information 151 to 153 output by the obtaining unit 220, for a frequency that corresponds to position p2 indicated by the position information 231 output by the identifying unit 230. In the example depicted in FIG. 2B, position p2 is included in the position information 151 and 152 and therefore, frequencies F1 and F2 are obtained as frequencies that correspond to position p2.

Thus, the mobile communications apparatus 200 receives radio signals of candidate frequencies and from the received signals of the candidate frequencies, obtains position information. As a result, for example, the mobile communications apparatus 200 can efficiently obtain position information related to available frequencies.

FIG. 2C is a diagram depicting another configuration example of the mobile communications apparatus according to the first embodiment. In FIG. 2C, parts identical to those depicted in FIG. 2B are given the same reference numerals used in FIG. 2B and description thereof is omitted. As depicted in FIG. 2B, the mobile communications apparatus 200 may further include a measuring unit 260 and selecting unit 270 in addition to the configuration depicted in FIG. 2B.

The measuring unit 260 measures based on the radio signals 161 to 163 output by the receiving unit 210, the communication quality between the mobile communications apparatus 200 and the communications apparatus 100, at each frequency. The communication quality is reception strength, for example. In the example depicted in FIG. 2C, the measuring unit 260 measures communication qualities q1 to q3 at frequencies F1 to F3.

However, configuration may be such that the measuring unit 260 measures at least the communication quality at the frequencies found by the search unit 240. In other words, the measuring unit 260 measures the communication quality at frequencies F1 and F2, and may omit measuring the communication quality at frequency F3. The measuring unit 26 outputs to the selecting unit 270, quality information 261 that indicates the communication qualities q1 to q3 measured respectively at frequencies F1 to F3.

The selecting unit 270 selects based on the quality information 261 output by the measuring unit 260 and from among frequencies F1 and F2 indicated by the frequency information 241 output by the search unit 240, a frequency to be used for wireless communication with the communications apparatus 100. For example, among frequencies F1 and F2, the selecting unit 270 selects the frequency indicated to have the highest communication quality by the quality information 261. In the example depicted in FIG. 2C, the communication quality q1 for frequency F1 is assumed to be higher than the communication quality q2 for frequency F2 and the selecting unit 270 is assumed to select frequency F1. The selecting unit 270 outputs to the communications unit 250, frequency information 271 that indicates the selected frequency F1.

The communications unit 250 uses frequency F1, which is indicated by the frequency information 271 output by the selecting unit 270 and wirelessly communicates with the communications apparatus 100. Consequently, even without a function of accessing the database 120, the mobile communications apparatus 200 can identify a frequency that can be used at the position of the mobile communications apparatus 200 and for which the communication quality is favorable, and can use the identified frequency to wirelessly communicate with the communications apparatus 100.

FIG. 3 is a diagram depicting an example of a communications system according to the first embodiment. As depicted in FIG. 3, a communications system 300 according to the first embodiment includes a radio tower 310, a base station 320, a mobile communications apparatus 330, and a database server 340. The communications apparatus 100 depicted in FIGS. 1A and 1B, for example, is applicable as the base station 320. The database 120 depicted in FIGS. 1A and 1B, for example, is applicable as the database server 340. The mobile communications apparatus 200 depicted in FIGS. 2A to 2C, for example, is applicable as the mobile communications apparatus 330.

The radio tower 310 is a primary side system that transmits, for example, broadcast signals such as for TV and radio. The frequency used by the radio tower 310 is assumed to be f1. A prohibited area 311 is a surrounding area of the radio tower 310 and an area in which a communications system that differs from the communications system of the radio tower 310 cannot use frequency f1.

The base station 320 and the mobile communications apparatus 330 are a second cellular system that uses frequencies (white space) that is not used by the radio tower 310, which is the primary side system. A coverage area 321 is a surrounding area of the base station 320 and an area in which wireless communication can be performed between the base station 320 and the mobile communications apparatus 330.

The database server 340 is, for example, a server that is connected to the base station 320 by cable and that can be accessed by the base station 320. On the other hand, the database server 340 is a server that the mobile communications apparatus 330 cannot directly access.

In the example depicted in FIG. 3, the mobile communications apparatus 330 is positioned at a portion where the coverage area 321 and the prohibited area 311 overlap. Therefore, a frequency other than frequency f1 is used for radio signals transmitted by the mobile communications apparatus 330 to the base station 320. Further, if the mobile communications apparatus 330 and the base station 320 bi-directionally transmit radio signals by TDD, using the same frequency, a frequency other than frequency f1 is also used for radio signals transmitted to the mobile communications apparatus 330 by the base station 320.

Figure 4A:
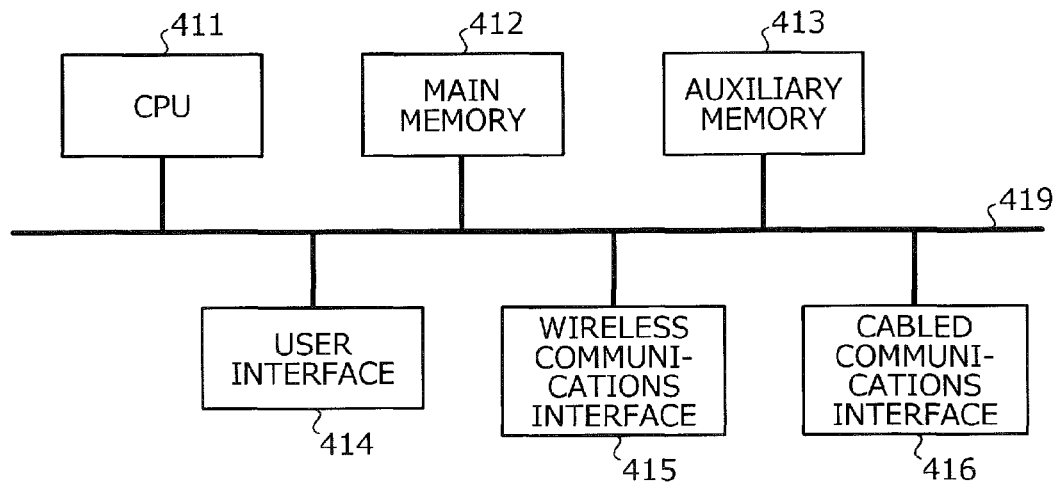
FIG. 4A is a diagram depicting a hardware configuration example of a base station.

FIG. 4A is a diagram depicting a hardware configuration example of the base station. The base station 320 depicted in FIG. 3, for example, may be implemented by an information processing apparatus 410 depicted in FIG. 4A. The information processing apparatus 410 includes a CPU 411, main memory 412, auxiliary memory 413, a user interface 414, a wireless communications interface 415, and a cabled communications interface 416. The CPU 411, the main memory 412, the auxiliary memory 413, the user interface 414, the wireless communications interface 415, and the cabled communications interface 416 are connected by a bus 419.

The central processing unit (CPU) 411 governs overall control of the information processing apparatus 410. The main memory 412 is, for example, random access memory (RAM). The main memory 412 is used as a work area of the CPU 411. The auxiliary memory 413 is, for example, non-volatile memory such as a hard disk and flash memory. The auxiliary memory 413 stores various programs that cause the information processing apparatus 410 to operate. Programs stored in the auxiliary memory 413 are loaded to the main memory 412 and executed by the CPU 411.

The user interface 414 includes, for example, an input device that receives operational input from a user and an output device that outputs information to the user. The input device may be implemented by, for example, a key (e.g., a keyboard) or a remote controller. The output device may be implemented by, for example, a display or speaker. Further, a touch panel may implement the input device and the output device. The user interface 414 is controlled by the CPU 411.

The wireless communications interface 415 is a communications interface that performs wireless communication with an external apparatus (e.g., the mobile communications apparatus 330) of the information processing apparatus 410. The cabled communications interface 416 is a communications interface that performs wired communication with an external apparatus (e.g., the database server 340) of the information processing apparatus 410. The wireless communications interface 415 and the cabled communications interface 416 are controlled by the CPU 411.

The identifying unit 110 depicted in FIGS. 1A and 1B may be implemented by, for example, the CPU 411 and the auxiliary memory 413. The obtaining unit 130 may be implemented by, for example, the CPU 411 and the cabled communications interface 416. The announcing unit 140 may be implemented by, for example, the wireless communications interface 415. The communications unit of the communications apparatus 100 may be implemented by, for example, the wireless communications interface 415.

Figure 4B:
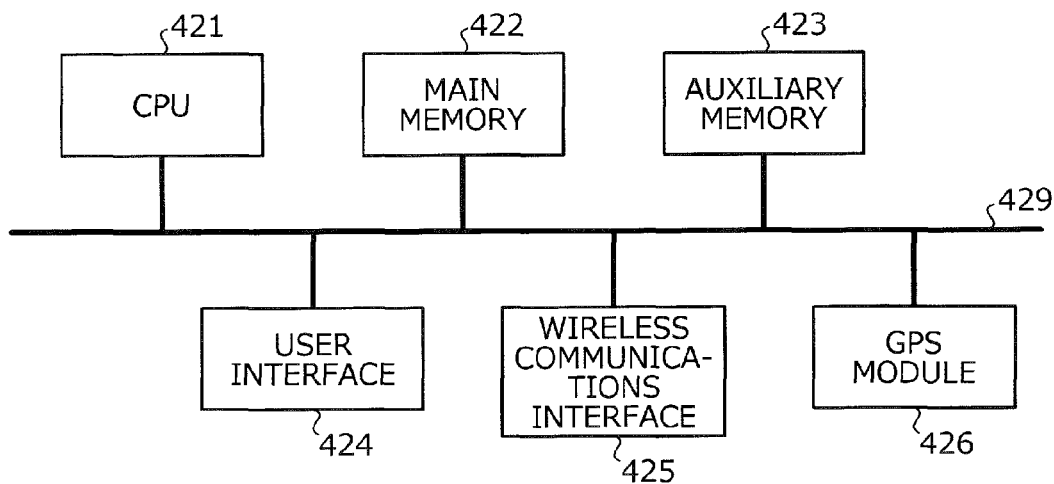
FIG. 4B is a diagram depicting a hardware configuration example of the mobile communications apparatus.

FIG. 4B is a diagram depicting a hardware configuration example of the mobile communications apparatus. The mobile communications apparatus 330 depicted in FIG. 3 may be implemented by, for example, an information processing apparatus 420 depicted in FIG. 4B. The information processing apparatus 420 includes a CPU 421, main memory 422, auxiliary memory 423, a user interface 424, a wireless communications interface 425, and a GPS module 426. The CPU 421, the main memory 422, the auxiliary memory 423, the user interface 424, the wireless communications interface 425, and the GPS module 426 are connected by a bus 429.

The CPU 421, the main memory 422, the auxiliary memory 423, and the user interface 424 are respectively the same as the CPU 411, the main memory 412, the auxiliary memory 413, and the user interface 414 depicted in FIG. 4A.

The wireless communications interface 425 is a communications interface that performs wireless communication with an external apparatus (e.g., the base station 320) of the information processing apparatus 420. The wireless communications interface 425 is controlled by the CPU 421. The indicates the current position of the information processing apparatus 420 by receiving GPS signals from GPS satellites. The GPS module 426 is controlled by the CPU 421.

The receiving unit 210 depicted in FIGS. 2A to 2C may be implemented by, for example, the wireless communications interface 425. The obtaining unit 220 may be implemented by, for example, the CPU 421. The identifying unit 230 may be implemented by, for example, the GPS module 426. The search unit 240 may be implemented by, for example, the CPU 421. The communications unit 250 may be implemented by, for example, the wireless communications interface 425.

Figure 4C:
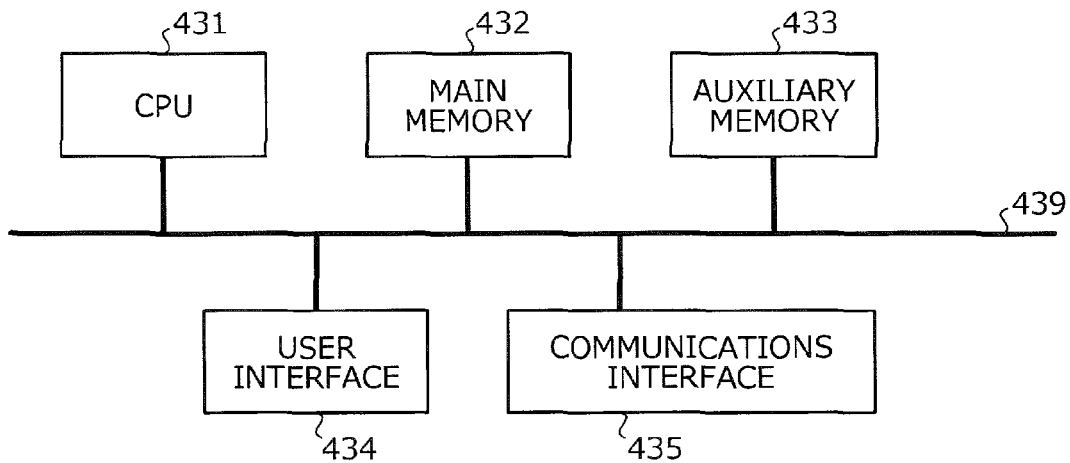
FIG. 4C is a diagram depicting a hardware configuration example of a database server.

FIG. 4C is a diagram depicting a hardware configuration example of the database server. The database server 340 depicted in FIG. 3 may be implemented by, for example, an information processing apparatus 430 depicted in FIG. 4C. The information processing apparatus 430 includes a CPU 431, main memory 432, auxiliary memory 433, a user interface 434, and a communications interface 435. The CPU 431, the main memory 432, the auxiliary memory 433, the user interface 434, and the communications interface 435 are connected by a bus 439.

The CPU 431, the main memory 432, the auxiliary memory 433, and the user interface 434 are respectively the same as the CPU 411, the main memory 412, the auxiliary memory 413, and the user interface 414 depicted in FIG. 4A.

The communications interface 435 is a communications interface that performs wireless or wired communication with an external apparatus (e.g., the base station 320) of the information processing apparatus 430. The communications interface 435 is controlled by the CPU 431.

Figure 5:
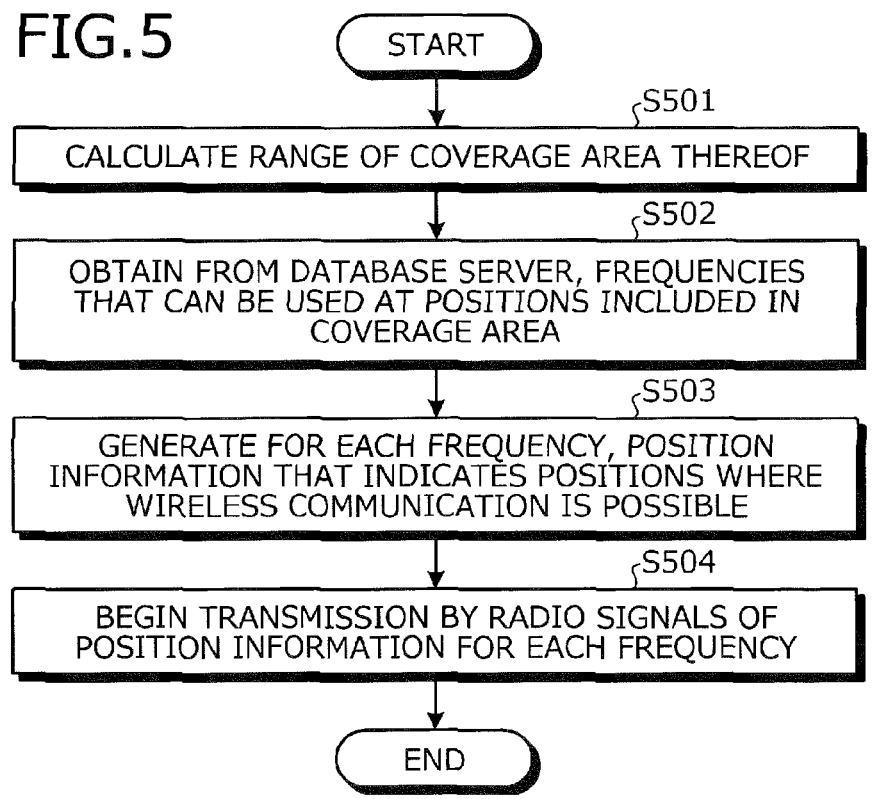
FIG. 5 is a flowchart depicting an example of operation of the base station according to the first embodiment.

FIG. 5 is a flowchart depicting an example of operation of the base station according to the first embodiment. The base station 320 calculates the range of the coverage area 321 thereof, based on, for example, the transmission power and transmission antenna pattern of the base station 320 (step S501). Calculation of the range of the coverage area 321 will be described hereinafter.

Based on the range of the coverage area 321 calculated at step S501, the base station 320 obtains from the database server 340, frequencies that can be used at positions included in the coverage area (step S502). Based on the frequencies obtained at step S502, the base station 320 generates for each frequency, position information that indicates positions at which wireless communication can be performed with the mobile communications apparatus 330 (step S503).

The base station 320 begins transmission by radio signals of the position information calculated for each frequency at step S503 (step S504), ending a series of operations. By the above operations, the base station 320 can obtain from the database server 340, frequencies that can be used at position in the coverage area 321 and announce the frequencies in the coverage area 321.

Figure 6:
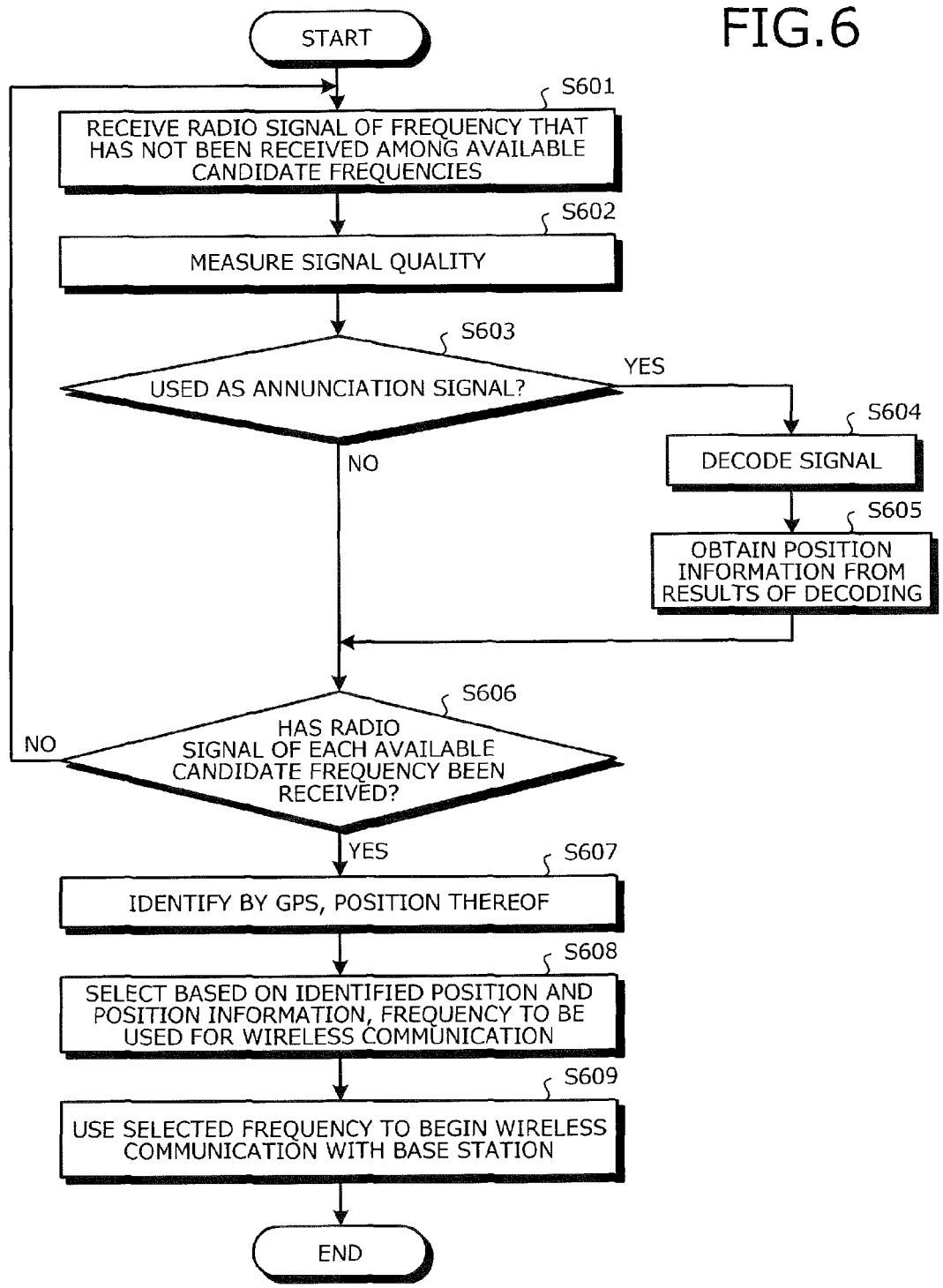
FIG. 6 is a flowchart depicting an example of operation of the mobile communications apparatus according to the first embodiment.

FIG. 6 is a flowchart depicting an example of operation of the mobile communications apparatus according to the first embodiment. The mobile communications apparatus 330 receives a radio signal of a frequency that has not been received among available candidate frequencies (step S601). The mobile communications apparatus 330 measures the signal quality of the radio signal received at step S601 (step S602).

The mobile communications apparatus 330 determines based on the signal quality measured at step S602, whether the radio signal received at step S601 is used as an annunciation signal (step S603). For example, if the signal quality is less than a threshold, the mobile communications apparatus 330 determines that radio signal is not used as an annunciation signal; and if the signal quality greater than or equal to the threshold, the mobile communications apparatus 330 determines that the radio signal is used as an annunciation signal. If the received radio signal is determined to be used as an annunciation signal (step S603: YES), the mobile communications apparatus 330 decodes the received radio signal (step S604).

The mobile communications apparatus 330 obtains position information from the results of decoding at step S604 (step S605), and transitions to step S606. The position information obtained at step S605 is information that indicates positions at which wireless communication with the base station 320 is possible using the same frequency as the frequency of the radio signal received at step S601.

At step S603, if the received radio signal is determined to not be used as an annunciation signal (step S603: NO), the mobile communications apparatus 330 determines whether a radio signal of each available candidate frequency has been received at step S601 (step S606). If a radio signal of each available candidate frequency has not been received at step S601 (step S606: NO), the mobile communications apparatus 330 returns to step S601.

At step S606, if a radio signal of each available candidate frequency her been received (step S606: YES), the mobile communications apparatus 330 identifies by GPS, the position of the mobile communications apparatus 330 (step S607). Next, the mobile communications apparatus 330 selects based on the position identified at step S607 and the position information obtained for each frequency at step S605, a frequency to be used for wireless communication with the base station 320 (step S608).

The mobile communications apparatus 330 uses the frequency selected at step S608 to begin wireless communication with the base station 320 (step S609), ending a series of operations. By the operations above, the mobile communications apparatus 330 can identify based on position information for each frequency announced by the base station 320, frequencies that can be used at the position of the mobile communications apparatus 330 and can use an identified frequency to wirelessly communicate with the base station 320.

The base station 320 can calculate the range of the coverage area 321 of the base station 320 by, for example, obtaining the area radius, using a propagation expression in free space. For example, assuming the effective radiation power (ERP) of the transmission antenna of the base station 320 to be P[W], the electric field intensity E[dBuV/m] at a position d[km] away from the transmission antenna of the base station 320 can be expressed by Equation (1) below.

$$E = 106.9 + 10 \cdot \log(P/1000) - 20 \cdot \log d \tag{1}$$

Therefore, assuming the electric field intensity of the coverage area of the base station 320 to be Ec(E=Ec), the radius Rc(d=Rc) of the coverage area 321 of the base station 320 can be expressed by Equation (2) below.

$$Rc = 10^{\frac{106.9 - Ec}{20}} \sqrt{\frac{P}{1000}} \; [\text{km}] \tag{2}$$

The base station 320, for example, regards a position of the base station 320 preliminarily stored in the memory of the base station 320 to be a center and can calculate a circle of the radius RC calculated by Equation (2) as the range of the coverage area 321.

Figure 7:
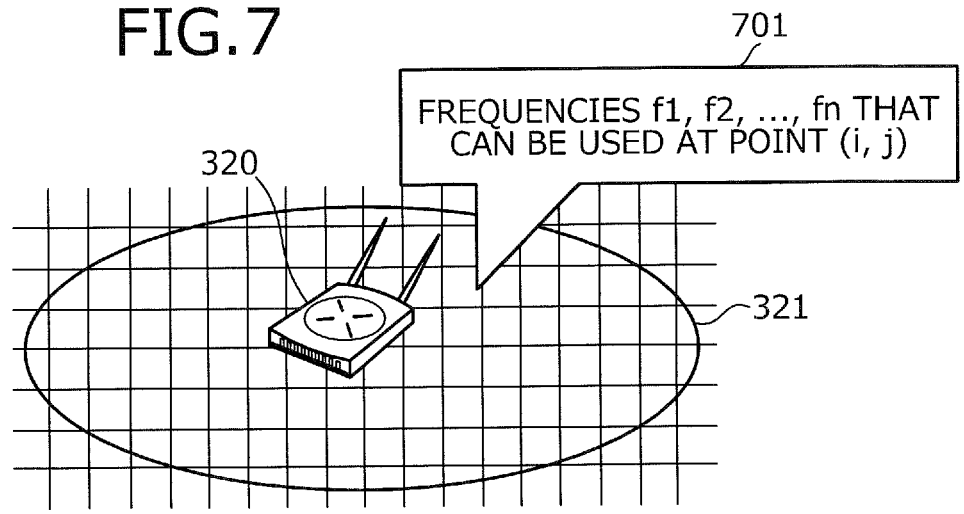
FIG. 7 is a diagram depicting an example of positions included in a coverage area.

FIG. 7 is a diagram depicting an example of positions included in the coverage area. In FIG. 7, parts identical to those depicted in FIG. 3 are given the same reference numerals used in FIG. 3 and description thereof is omitted. As depicted in FIG. 7, the base station 320 divides the coverage area 321 into a grid state and uses each point (i, j) of the grid as positions in the coverage area 321. The base station 320 calculates based on the radius Rc of the coverage area 321 calculated by Equation (2), each point (i, j) included in the coverage area 321.

The base station 320 notifies the database server 340 of each calculated point (i, j) and thereby, obtains from the database server 340, a set f(i, j)={f1, f2, . . . , fn} of frequencies that can be used at each point (i, j), respectively. A point set P(fk) of an area in which frequency Fk is white space is assumed to be a set of points (i, j) that includes frequency Fk in the list of f(i, j).

Figure 8:
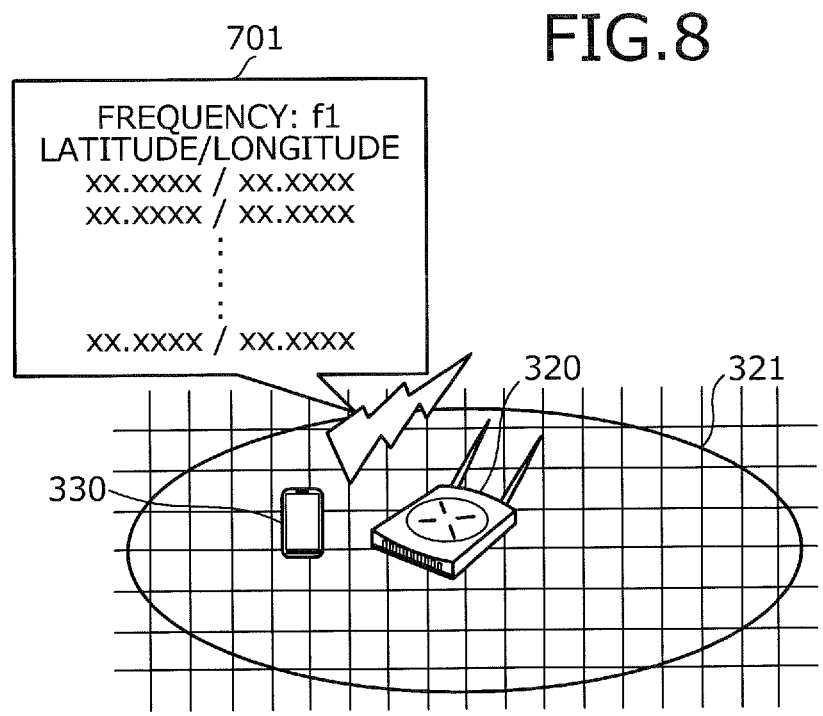
FIG. 8 is a diagram depicting an example of position information transmitted by the base station.

FIG. 8 is a diagram depicting an example of position information transmitted by the base station. In FIG. 8, parts identical to those depicted in FIG. 7 are given the same reference numerals used in FIG. 7 and description thereof is omitted. Position information 701 depicted in FIG. 8 is position information for frequency f1, among the position information for each frequency included in the radio signals transmitted by the base station 320. The position information 701 stores information concerning combinations of latitude and longitude of positions at which frequency f1 can be used.

Similarly, for frequencies other than frequency f1, the base station 320 transmits position information that stores information concerning combinations of latitude and longitude of positions at which the other frequencies can be used. Thus, as position information concerning frequency Fk, the base station 320 transmits a list that includes frequency Fk and the point set P(fk) that indicates the points at which frequency Fk can be used. Further, the base station 320 transmits the position information for frequency Fk by a radio signal of frequency Fk.

The mobile communications apparatus 330 performs scans for candidate frequencies to be used and determines which frequency is used, based on signal quality and further decodes the signals of each frequency to thereby, obtain the position information for each frequency. More specifically, based on the point set P(fk) and the position (x, y) of the mobile communications apparatus 330 identified by GPS, the mobile communications apparatus 330 can determine that frequency Fk can be used if (x, y)∈P(fk) is satisfied.

Figure 9:
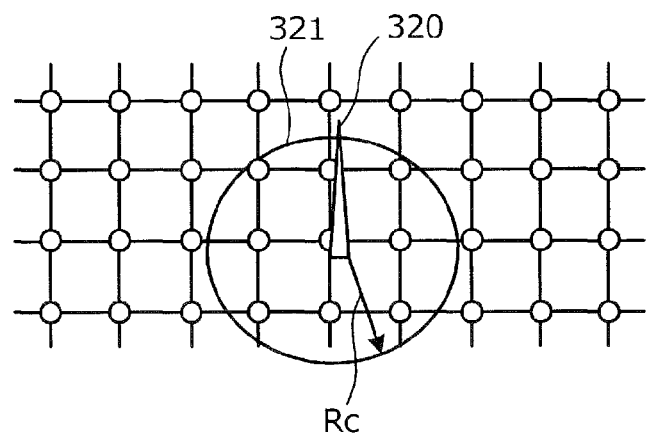
FIG. 9 is a diagram depicting an example of positions included in the coverage area.

FIG. 9 is a diagram depicting an example of positions included in the coverage area. In FIG. 9, parts identical to those depicted in FIG. 3 are given the same reference numerals used in FIG. 3 and description thereof is omitted. As depicted in FIG. 9, in nine grid vertices are included in the coverage area 321 of the radius Rc calculated by the base station 320.

Figure 10:
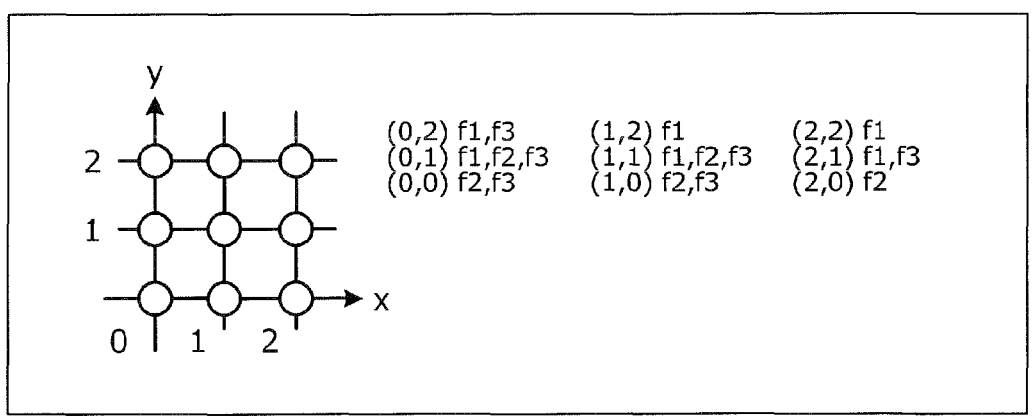
FIG. 10 is a diagram depicting an example of frequencies that can be used at each position.

FIG. 10 is a diagram depicting an example of frequencies that can be used at each position. The nine grid vertices included in the coverage area 321 depicted in FIG. 9 are assumed to be expressed by points (0, 0), (0, 1), (0, 2), (1, 0), . . . , (2, 2) on xy coordinate axes. Further, candidates of frequencies to be used are assumed to be the three frequencies f1, f2, and f3.

In FIG. 10, frequencies that can be used as each point are depicted. For example, frequencies that can be used at point (0, 0) are frequencies f1 and f3. Further, the frequency that can be used at point (1, 2) is frequency f1.

Figure 11:
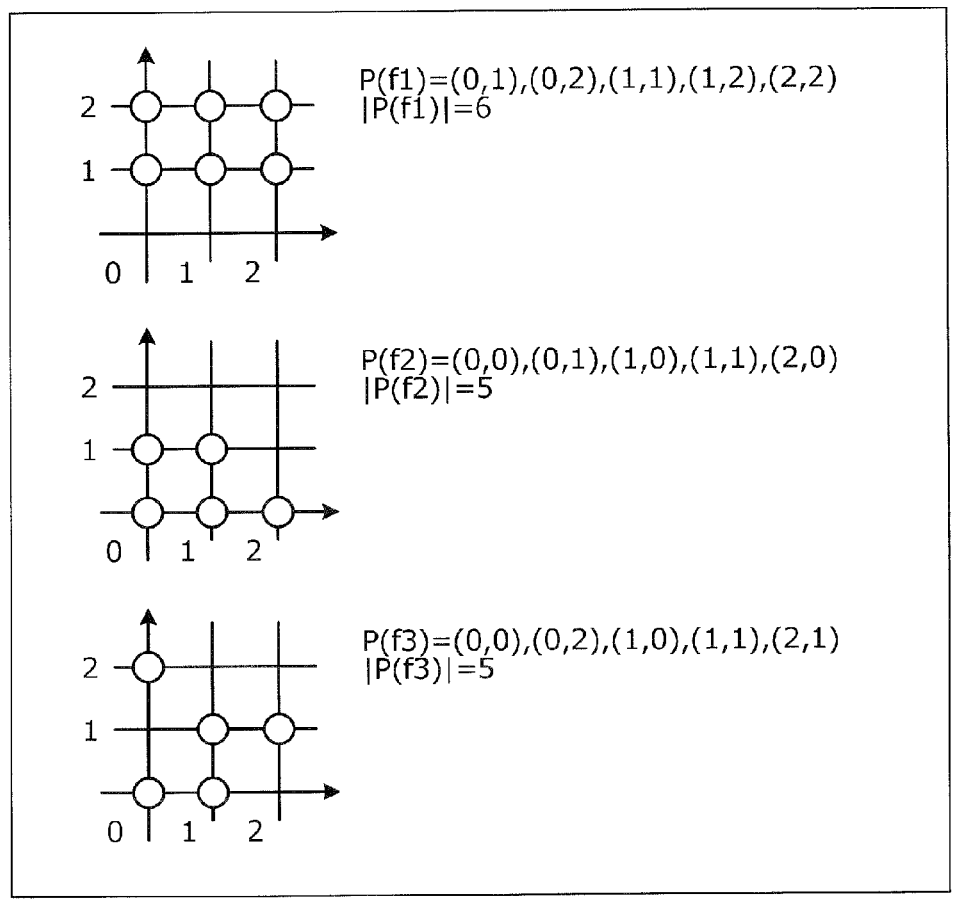
FIG. 11 is a diagram depicting an example of positions where frequencies are white space.

FIG. 11 is a diagram depicting an example of positions where frequencies are white space. As depicted in FIG. 11, based on the frequencies that can be used at the positions depicted in FIG. 10, the base station 320 calculates for each of the frequencies f1 to f3, a point set P(fk) indicating positions where the frequency f1 to f3 is white space. The base station 320 announces the calculated point set P(fk) as position information for each frequency, by a radio signal.

Figure 12:
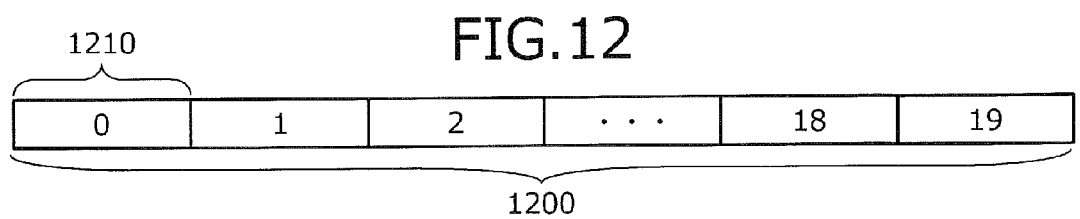
FIG. 12 is a diagram depicting an example of a transmission frame of the base station.

FIG. 12 is a diagram depicting an example of a transmission frame of the base station. A transmission frame 1200 depicted in FIG. 12 is one unit (20 time slots) of a transmission frame at the base station 320. For example, the base station 320 regards the head time slot of the transmission frame 1200 as an annunciation signal slot 1210 and stores position information to the annunciation signal slot 1210. Consequently, position information is periodically announced.

Figure 13:
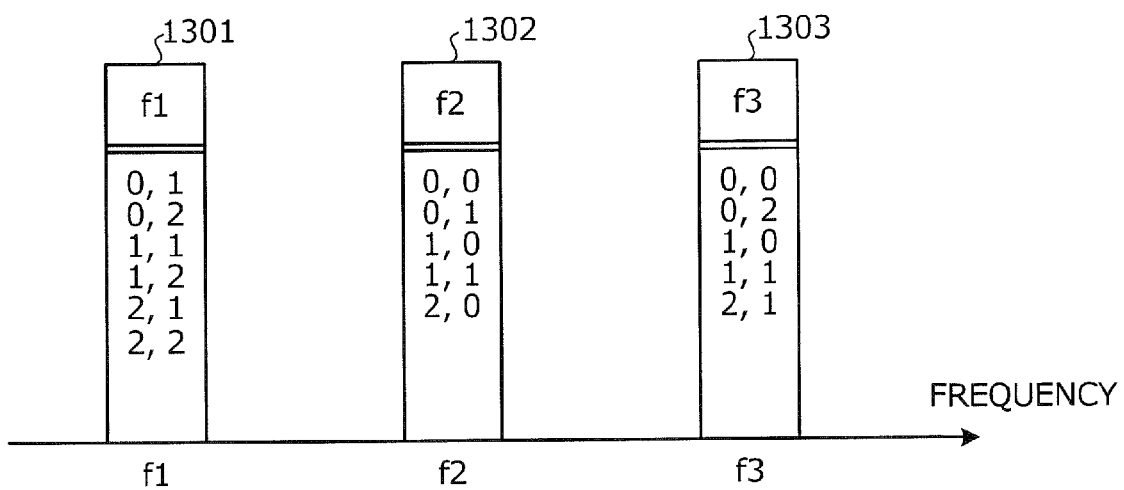
FIG. 13 is a diagram depicting an example of radio signals of each frequency and transmitted by the base station.

FIG. 13 is a diagram depicting an example of radio signals of each frequency and transmitted by the base station. Radio signals 1301 to 1303 depicted in FIG. 13 are radio signals respectively of frequencies f1 to f3. Further, the radio signals 1301 to 1303 include position information that corresponds the respective frequency f1 to f3 thereof. For example, the radio signal 1301 of frequency f1 includes positions (0,1), (0,2), (1,1), (1,2), (2,1), and (2,2) as positions at which frequency f1 is white space.

FIG. 14 is a block diagram depicting an example of a radio signal decoding process by the mobile communications apparatus. In FIG. 14, parts identical to those depicted in FIG. 13 are indicated by the same reference numerals used in FIG. 13 and description thereof is omitted. The mobile communications apparatus 330 includes, for example, filters 1411 to 1413, decoding units 1421 to 1423, signal quality measuring units 1431 to 1433, and a frequency determining unit 1440. In the coverage area 321, the mobile communications apparatus 330 receives radio signals that include the radio signals 1301 to 1303 of frequencies f1, f2, and f3.

The filter 1411 extracts from among the received signals, the signal of frequency f1 only and thereby, obtains a reception signal 1401 of the radio signal 1301. The filter 1411 outputs the obtained reception signal 1401 to the decoding unit 1421 and the signal quality measuring unit 1431. The filter 1412 extracts from among the received signals, the signal of frequency f2 only and thereby, obtains a reception signal 1402 of the radio signal 1302. The filter 1412 outputs the obtained reception signal 1402 to the decoding unit 1422 and the signal quality measuring unit 1432. The filter 1413 extracts from among the received signals, the signal of frequency f3 only and thereby, obtains a reception signal 1403 of the radio signal 1303. The filter 1413 outputs the obtained reception signal 1403 to the decoding unit 1423 and the signal quality measuring unit 1433.

The decoding units 1421 to 1423 respectively decode the reception signals 1401 to 1403 respectively output by the filters 1411 to 1413 and output decoding results to the frequency determining unit 1440. The signal quality measuring units 1431 to 1433 respectively measure the signal quality of the reception signals 1401 to 1403 respectively output by the filters 1411 to 1413 and output the measured signal qualities to the frequency determining unit 1440. In the example depicted in FIG. 14, the signal quality measuring units 1431 to 1433 are assumed to respectively measure the reception strengths 10 [dB], −2 [dB], 14 [dB] of the reception signals 1401 to 1403 as signal quality.

The frequency determining unit 1440 searches the decoding results output by the decoding units 1421 to 1423, for frequencies that correspond to the position of the mobile communications apparatus 330. For example, if the position of the mobile communications apparatus 330 is position (2, 1), decoding results from the decoding units 1421 and 1423 include position (2, 1) (for example, refer to FIG. 13) and therefore, the mobile communications apparatus 330 selects frequencies f1 and f3.

The mobile communications apparatus 330 further selects from among the selected frequencies f1 and f3, the frequency for which the signal quality output by the signal quality measuring units 1431 to 1433 is higher. In the example depicted in FIG. 14, the signal quality (14 [dB]) output by the signal quality measuring unit 1433 is higher than the signal quality (10 [dB]) output by the signal quality measuring unit 1431 and therefore, the mobile communications apparatus 330 selects frequency f3 as the frequency to be used for wireless communication with the base station 320.

Thus, the frequency to be used for wireless communication with the base station 320 can be determined. The mobile communications apparatus 330 notifies the base station 320 of frequency f3 determined by the frequency determining unit 1440 and begins the wireless communication with the base station 320, using frequency f3.

Thus, the communications apparatus 100 and the mobile communications apparatus 200 according to the first embodiment enable the communications apparatus 100 to obtain from the database 120 and announce in the coverage area, the frequencies that can be used at positions in the coverage area. Consequently, the mobile communications apparatus 200 in the coverage area can identify frequencies that the mobile communications apparatus 200 can use. As a result, the frequencies that can be used increase, enabling improved utilization efficiency of frequency.

Concerning the communications apparatus 100, the mobile communications apparatus 200, and the communications system 300 according to a second embodiment, differences from the communications apparatus 100, the mobile communications apparatus 200, and the communications system 300 according to the first embodiment will be described.

FIG. 15 is a diagram depicting a configuration example of the communications apparatus according to the second embodiment. In FIG. 15, parts identical to those depicted in FIG. 1B are given the same reference numerals used in FIG. 1B and description thereof is omitted. As depicted in FIG. 15, the communications apparatus 100 according to the second embodiment further includes a selecting unit 1510 in addition to the configuration depicted in FIG. 1B. The selecting unit 1510 may be implemented by, for example, the CPU 411 depicted in FIG. 4A.

The selecting unit 1510 selects from among frequencies f1 to f3 that can be used and based on the position information 151 to 153 output by the obtaining unit 130, a frequency that can be used for wireless communication at more positions than frequencies other than frequencies F1 to F3. For example, the selecting unit 1510 selects from among frequencies F1 to F3 that can be used, the frequency that can be used for wireless communication at the most positions.

The selecting unit 1510 may select from among frequencies F1 to F3, the two frequencies that can be used for wireless communication at the most and the second most positions. In other words, the selecting unit 1510 may select from among frequencies that can be used, N frequencies that can be used for wireless communication at the most to an N-th most positions (where, N is natural number less than the number of frequencies that can be used). Consequently, frequencies that have a wide area of use in the coverage area of the communications apparatus 100 can be selected.

For example, the number of positions p2, p3, . . . corresponding to frequency F1 is assumed to be greater than the number of positions p2, . . . corresponding to frequency F2 and the number of positions p3, . . . , pm corresponding to frequency F3. In this case, the selecting unit 1510 selects frequency F1, for example. Of the position information 151 to 153, the selecting unit 1510 outputs to the announcing unit 140, the position information 151 that corresponds to the selected frequency F1. The announcing unit 140 announces by the radio signal 161, the position information 151 output by the selecting unit 1510. Therefore, in the example depicted in FIG. 15, the position information 152 and 153 is not announced.

Thus, the communications apparatus 100 according to the second embodiment selects from among frequencies that can be used, frequencies that can be used for wireless communication at numerous positions and announces in the coverage area, the position information of the selected frequencies. Consequently, the volume of information announced in coverage area can be decreased and information of frequencies that can be used by more mobile communications apparatuses in the coverage area can be announced.

Figure 16A:
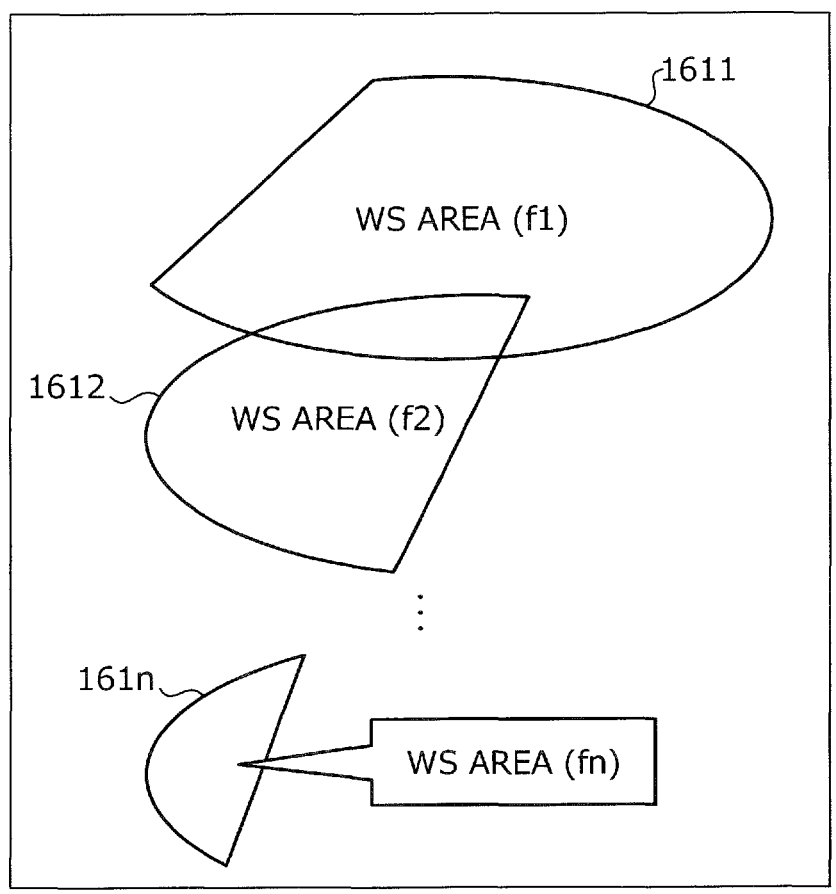
FIG. 16A is a diagram depicting an example of WS areas of frequencies.

FIG. 16A is a diagram depicting an example of the WS areas of frequencies. In FIG. 16A, WS areas 1611 to 161n depict areas where frequencies f1 to fn are respectively white space. For example, the base station 320 wirelessly transmits position information indicating the WS area 1611, which has the largest area among the WS areas 1611 to 161n, and does not wirelessly transmit information concerning the WS areas 1612 to 161n.

Figure 16B:
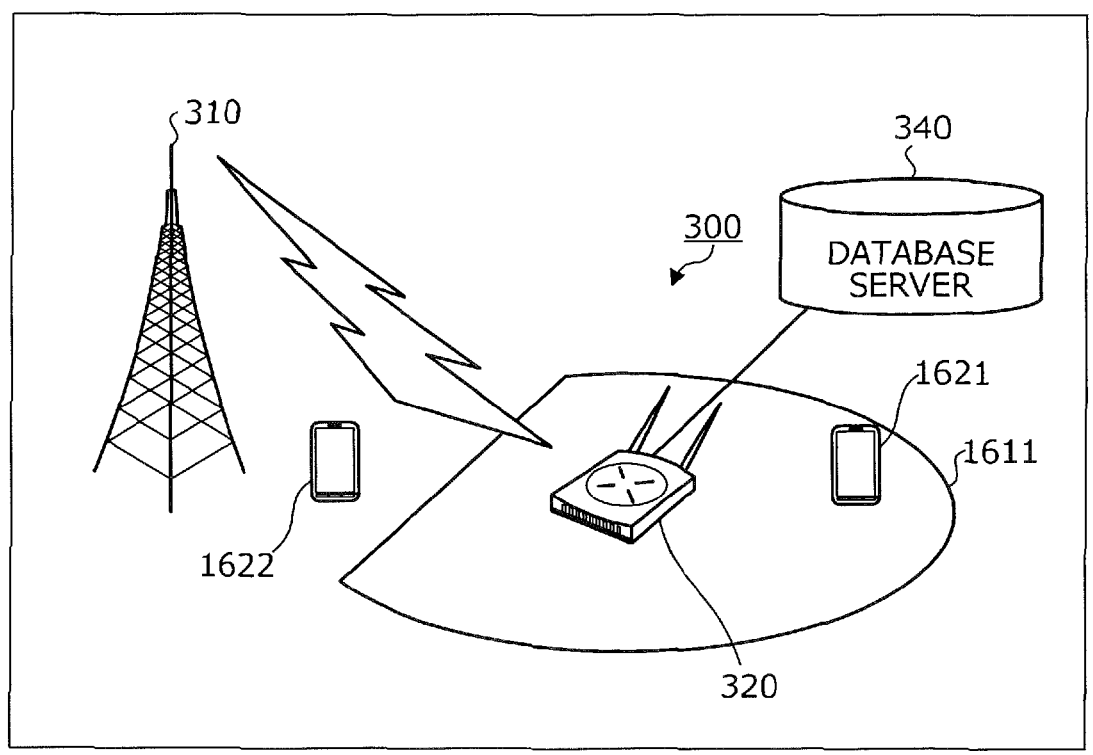
FIG. 16B is a diagram depicting an example of operation of the communications system according to the second embodiment.

FIG. 16B is a diagram depicting an example of operation of the communications system according to the second embodiment. In FIG. 16B, parts identical to those depicted in FIG. 3 are given the same reference numerals used in FIG. 3 and description thereof is omitted. Mobile communications apparatuses 1621 and 1622 are the same mobile communications apparatus as the mobile communications apparatus 330 depicted in FIG. 3. However, the mobile communications apparatus 1621 is located in the WS area 1611 indicated by the position information of frequency f1, announced by the base station 320. Therefore, based on the position information from the base station 320, the mobile communications apparatus 1621 can perform wireless communication with the mobile communications apparatus 330 by frequency f1.

On the other hand, the mobile communications apparatus 1622 is located in the WS area 1612 and not the WS area 1611. Although frequency f2 can be used for wireless communication in the WS area 1612, the position information of frequency f2 is not announced by the base station 320. Therefore, the mobile communications apparatus 1621 cannot obtain a frequency that can be used thereby and consequently, does not wirelessly communicate with the mobile communications apparatus 330.

FIG. 17 is a flowchart depicting an example of operation of the base station according to the second embodiment. The base station 320 according to the second embodiment, for example, executes the following operations. The operations at steps S1701 to S1703 depicted in FIG. 17 are the same as the operations at steps S501 to S503 depicted in FIG. 5.

Subsequent to the operation at step S1703, the base station 320 calculates for each frequency and based on the position information calculated for each frequency at step S1703, the area of a WS area in which wireless communication is possible (step S1704). For example, the base station 320 calculates for each frequency Fk that can be used, point set P(fk) count|P(fk)| and regards the calculation result as the area A(fk) of the area for frequency Fk.

The base station 320 selects from among frequencies that can be used, the frequency for which the area of the WS area calculated at step S1704 is greatest (step S1705). The base station 320 begins transmission by a radio signal of the position information that indicates positions at which the frequency selected at step S1705 can be used (step S1706), ending a series of operations. By the operations above, the base station 320 reduces the position information announced in the coverage area 321, enabling reductions in the volume of information and announcement of information concerning frequencies that can be used by more mobile communications apparatuses in the coverage area 321.

Figure 18:
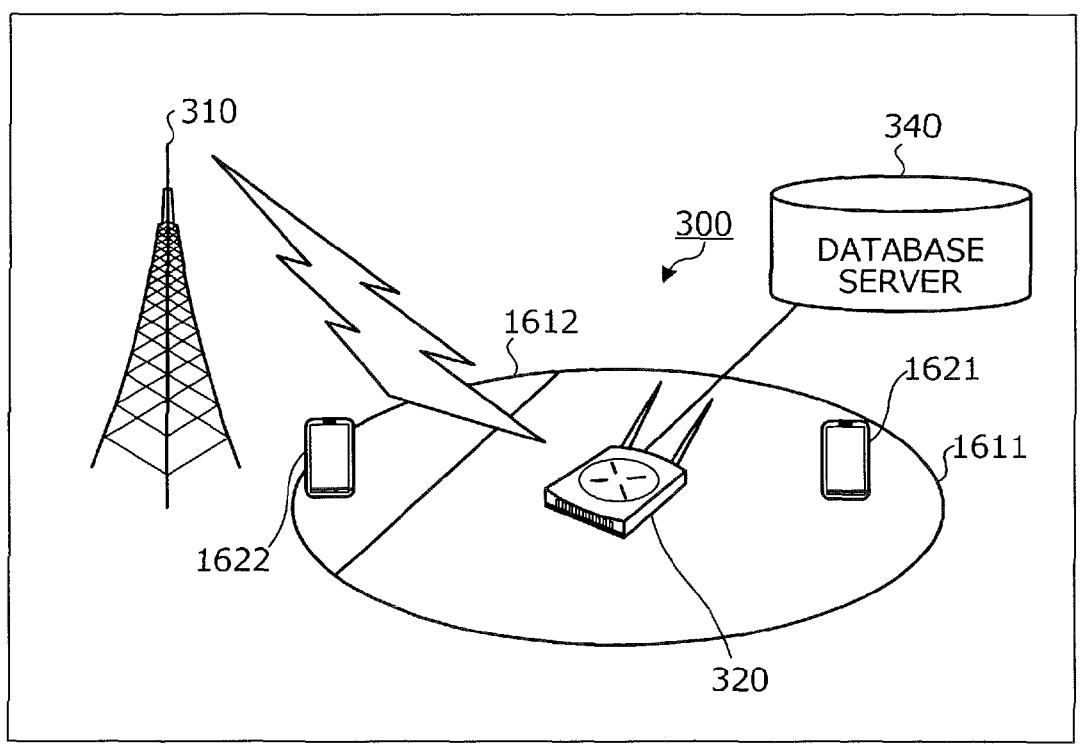
FIG. 18 is a diagram depicting an example of operation of the communications system according to the second embodiment.

FIG. 18 is a diagram depicting an example of operation of the communications system according to the second embodiment. In FIG. 18, parts identical to those depicted in FIG. 16A or FIG. 16B are given the same reference numerals used in FIGS. 16A and 16B, and description thereof is omitted. As depicted in FIG. 18, the base station 320 may announce position information that in addition to the WS area 1611 of frequency f1 for which the area is greatest, indicates the position of the WS area 1612 (corresponding to frequency f2) that covers in the coverage area 321, an area not included in the WS area 1611.

Thus, the mobile communications apparatus 1622 located in the WS area 1612 can wirelessly communicate with the mobile communications apparatus 330 by frequency f2, based on the position information from the base station 320. Consequently, at any position in the coverage area 321, wireless communication can be performed using frequency f1 or frequency f2.

Figure 19:
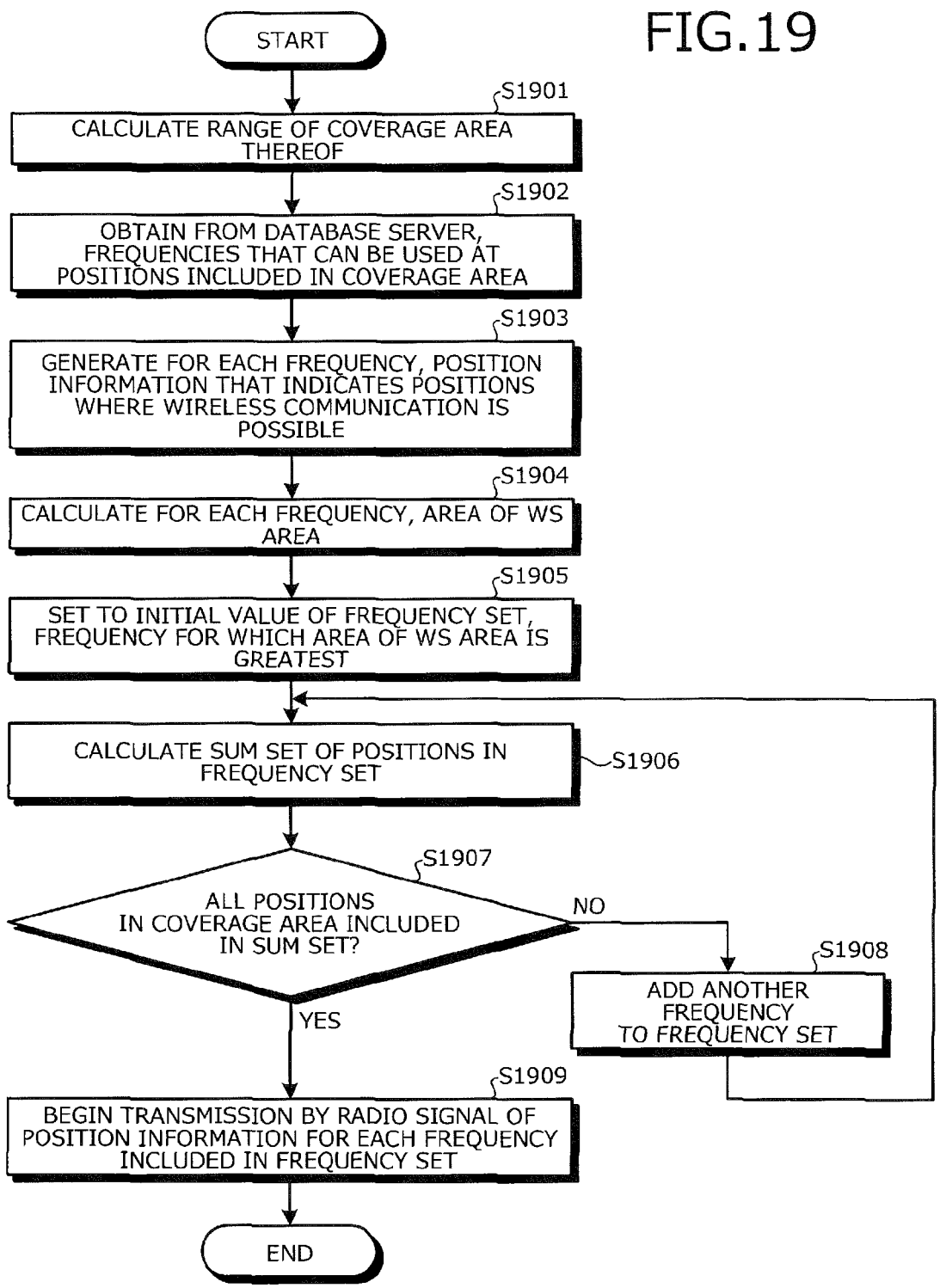
FIG. 19 is a flowchart depicting another example of operation of the base station according to the second embodiment.

FIG. 19 is a flowchart depicting another example of operation of the base station according to the second embodiment. The base station 320 according to the second embodiment may execute the operations below. The operations at steps S1901 to S1904 depicted in FIG. 19 are the same as the operations at steps S1701 to S1704 depicted in FIG. 17. Subsequent to the operation at step S1904, the base station 320 sets the frequency for which the area of the WS area is greatest to an initial value of the frequency set (step S1905).

The base station 320 calculates a sum set of positions at which wireless communication can be performed using frequencies in the current frequency set (step S1906). For example, assuming a frequency set f to be f={f1, f2, f3}, in this case the base station 320 calculates a sum set P(f1)∪P(f2)∪P(f3) of an area P(f1), P(f2), P(f3). The base station 320 determines whether all positions in the coverage area 321 are included in the sum set calculated at step S1905 (step S1907).

At step S1907, if all of positions in the coverage area 321 are not included in the sum set (step S1907: NO), the base station 320 adds to the frequency set, another frequency that is not included in the frequency set (step S1908), and returns to the operation at step S1906. If all of the positions in the coverage area 321 are included in the sum set (step S1907: YES), the base station 320 begins transmission by a radio signal of the position information for each frequency included in the frequency set (step S1909), ending a series of the operations.

By the operations above, the base station 320 reduces the position information announced to the coverage area 321, enabling reductions in the volume of information and announcement of information concerning frequencies that can be used at positions in the coverage area 321.

Figure 20:
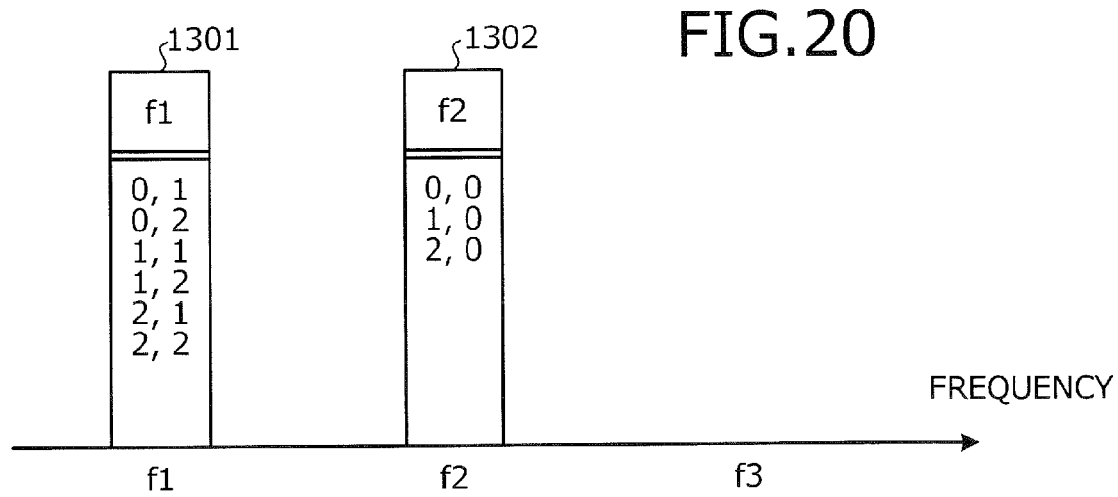
FIG. 20 is a diagram depicting an example of radio signals that are transmitted by the base station for each frequency.

FIG. 20 is a diagram depicting an example of radio signals that are transmitted by the base station for each frequency. In FIG. 20, parts identical to those depicted in FIG. 13 are given the same reference numerals used in FIG. 13 and description thereof is omitted. For example, in the example depicted in FIG. 11, the areas of the WS spaces of frequencies f1, f2, and f3 are respectively |P(f1)|=6, |P(f2)|=5, and |P(f3)|=5.

Therefore, as depicted in FIG. 20, for example, the base station 320 transmits by the radio signal 1301, the position information of frequency f1 for which the area of the WS space is greatest. Further, since the base station 320 cannot cover the coverage area 321 entirely by frequency F1 alone, the base station 320 transmits by the radio signal 1302, the position information of frequency F2, which supplements the positions where frequency F1 is white space.

However, as depicted in FIG. 20, among the positions where frequency f2 is white space, the positions included in the radio signal 1301 may be excluded from the radio signal 1302. As a result, the volume of position information can be further reduced. In the example depicted in FIG. 20, the radio signal 1302 includes positions (0, 0), (1, 0), and (2, 0) as positions where frequency f2 is white space.

Thus, the communications apparatus 100 and the mobile communications apparatus 200 according to the second embodiment enable frequencies that can be used for wireless communication at numerous positions to be selected from among frequencies that can be used, and enable the position information of the selected frequencies to be announced in coverage area. As a result, the volume of information announced in coverage area can be reduced and information of frequencies that can be used by more mobile communications apparatuses in the coverage area can be announced.

Concerning the communications apparatus 100, the mobile communications apparatus 200, and the communications system 300 according to a third embodiment, differences from the communications apparatus 100, the mobile communications apparatus 200, and the communications system 300 according to the first embodiment or the second embodiment will be described.

Figure 21:
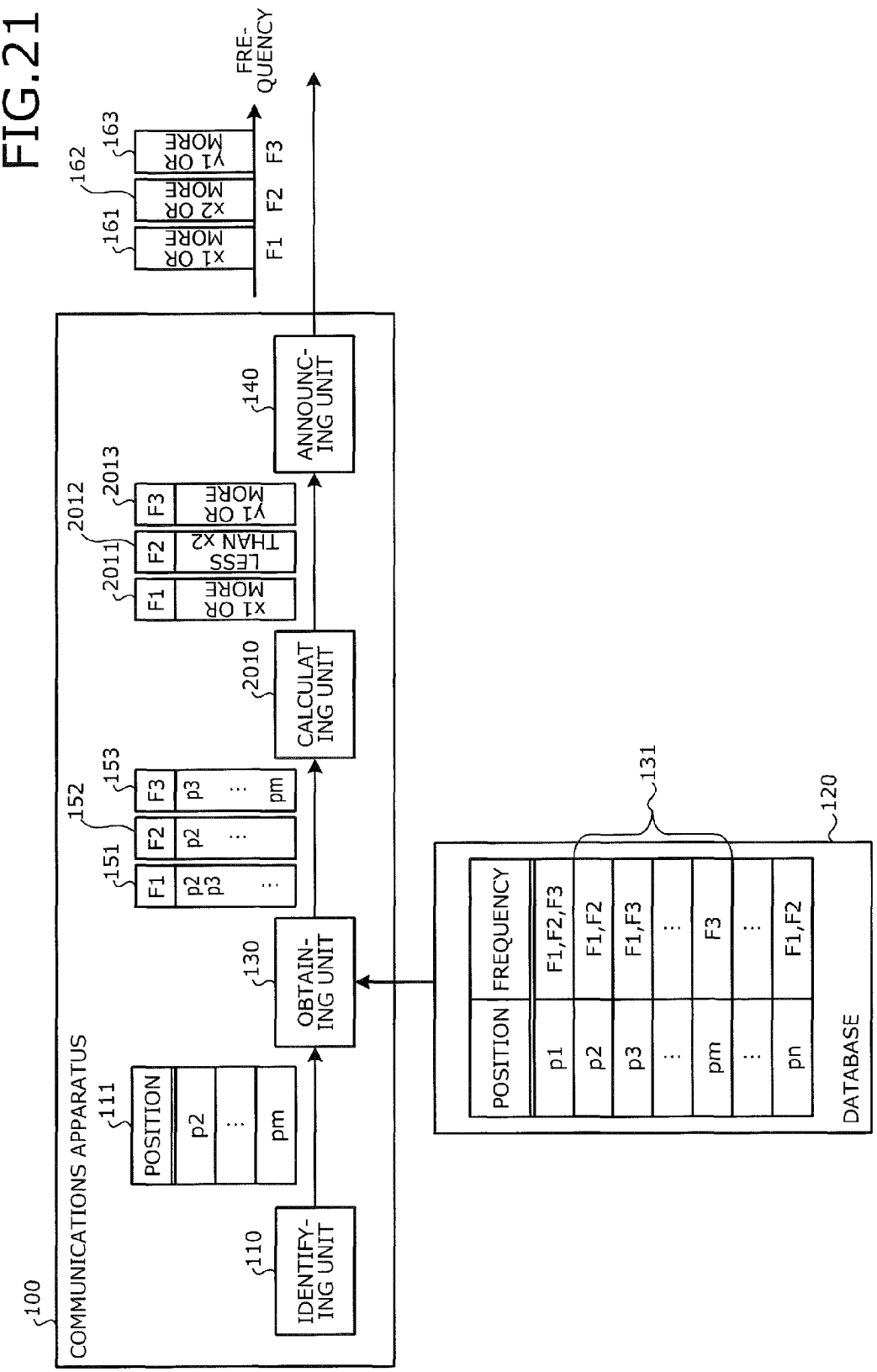
FIG. 21 is a diagram depicting a configuration example of the communications apparatus according to a third embodiment.

FIG. 21 is a diagram depicting a configuration example of the communications apparatus according to the third embodiment. In FIG. 21, parts identical to those depicted in FIG. 1B are given the same reference numerals used in FIG. 1B and description thereof is omitted. As depicted in FIG. 21, the communications apparatus 100 according to the third embodiment further includes a calculating unit 2010 in addition to the configuration depicted in FIG. 1B. The calculating unit 2010 calculates for each frequency that can be used and based on the position information 151 to 153 output by the obtaining unit 130, approximate range information that in the coverage area of the communications apparatus 100, indicates approximately a range of positions at which the frequencies can be used for wireless communication.

In the example depicted in FIG. 21, the calculating unit 2010 is assumed to calculate a range in which the latitude is x1 [degrees] or greater, as a range of positions at which wireless communication is possible using frequency f1 in the coverage area of the communications apparatus 100. Further, the calculating unit 2010 is assumed to calculate a range in which the latitude is less than x2 [degrees], as a range of positions at which wireless communication is possible using frequency f2. The calculating unit 2010 is assumed to calculate a range in which the latitude is y1 [degrees] or greater, as a range of positions at which wireless communication is possible using frequency f3.

The calculating unit 2010 outputs to the announcing unit 140, range information 2011 to 2013 that indicates the ranges respectively calculated for frequencies f1 to f3. The announcing unit 140 announces by the radio signals 161 to 163 respectively of frequencies f1 to f3, the range information 2011 to 2013 output by the calculating unit 2010.

Figure 22:
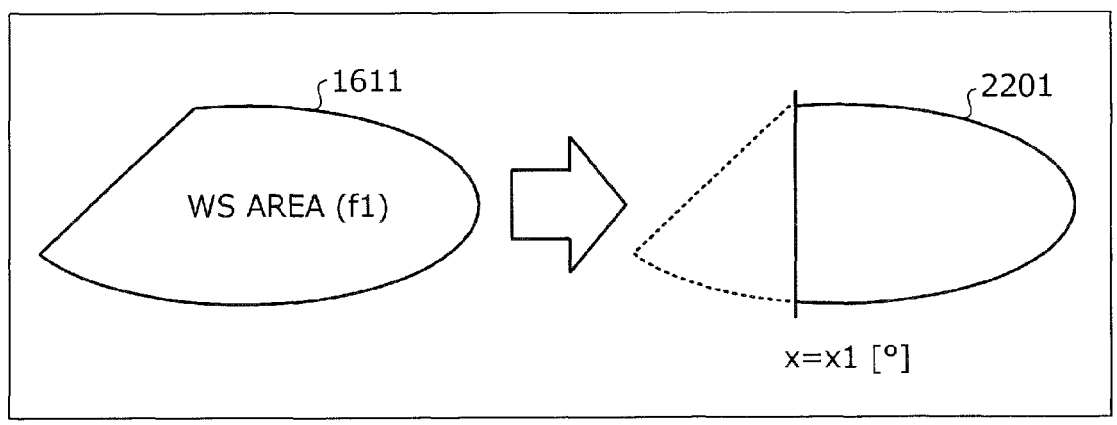
FIG. 22 is a diagram depicting an example of approximation of area information.

FIG. 22 is a diagram depicting an example of approximation of area information. In FIG. 22, parts identical to those depicted in FIG. 16A are given the same reference numerals used in FIG. 16A and description thereof is omitted. The base station 320, for example, calculates in the WS area 1611 in which frequency f1 can be used, an area 2201 in which at all longitudes, the latitude at which frequency f1 can be used is x1 [degrees] or more, the area being calculated as an area that approximates the WS area 1611.

In this case, the base station 320 announces by a radio signal of frequency f1, information that indicates the latitude=x1 [degrees] or more. Since the latitude the position of a mobile communications apparatus located in the area 2201 is x1 [degrees] or more, the mobile communications apparatus can determine based on the range information announced by the base station 320, that frequency f1 can be used for wireless communication with the base station 320.

Thus, the base station 320 announces as range information (correspondence information), the range of the latitudes x in the coverage area 321 and at which wireless communication is possible at all of the longitudes y. The base station 320 may announce as range information (correspondence information), the range of the longitudes y in the coverage area 321 and at which wireless communication is possible at all of the latitudes x.

Figure 23:
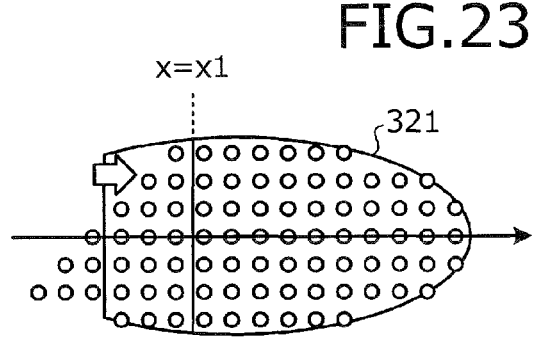
FIG. 23 is a diagram depicting an example of area approximation.

FIG. 23 is a diagram depicting an example of area approximation. Each point depicted in FIG. 23 indicates positions at which frequency f1 can be used for wireless communication in the coverage area 321. For example, the base station 320 increases the latitude x from a minimum value (e.g., 0) of the latitude of the coverage area 321 and calculates a latitude x1 at which wireless communication is possible at all longitudes of the coverage area 321 at the current latitude. The base station 320 announces as range information, information that includes the calculated latitude x1 as a parameter.

Transmission of a combination of {frequency, cutoff position parameter, large/small flag}, using frequency f1 may be considered as a form of the annunciation signal. In this case, the form of the annunciation signal, for example, is {f1, x1, greater (determined logically to be 0 or 1)}.

Figure 24:
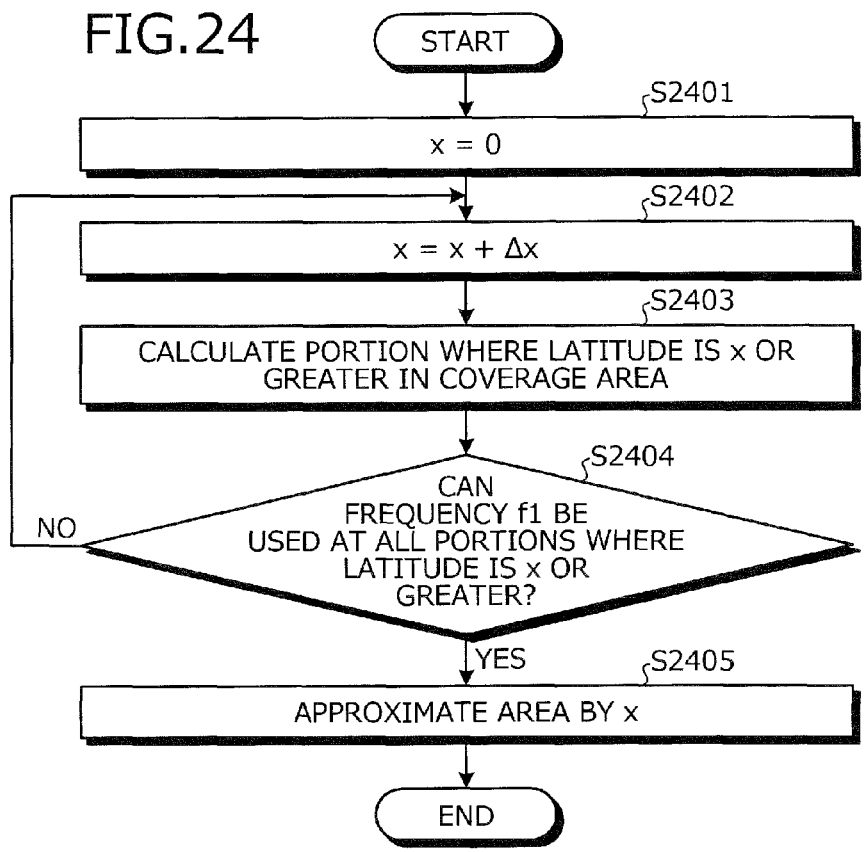
FIG. 24 is a flowchart depicting an example of an area approximation process.

FIG. 24 is a flowchart depicting an example of an area approximation process. The base station 320, for example, performs the following operations for each frequency that can be used. The base station 320 sets the latitude x to zero (step S2401). The base station 320 increases the latitude x by a unitary variation amount Δx (step S2402). The base station 320 calculates a portion (positions) where the latitude is x or greater in the coverage area 321 (step S2403).

The base station 320 determines whether frequency f1 can be used at all the portions where the latitude is x or greater as calculated at step S2403 (step S2404). At step S2404, if frequency f1 cannot be used at all of the portions where the latitude is x or greater (step S2404: NO), the base station 320 returns to step S2402.

At step S2404, if frequency f1 can be used at all the portions where the latitude is x or greater (step S2404: YES), the base station 320 approximates by the latitude x at this time, an area in which wireless communication by frequency f1 is possible (step S2405), ending a series of operations. The base station 320 announces by a radio signal, range information that includes the latitude x at step S2405.

Figure 25:
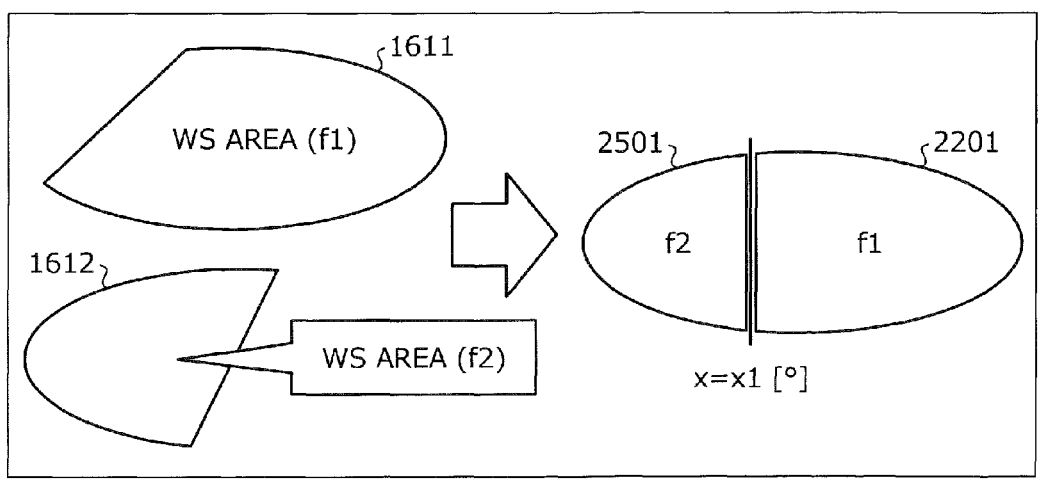
FIG. 25 is a diagram depicting an example of area division.

FIG. 25 is a diagram depicting an example of area division. In FIG. 25, parts identical to those depicted in FIG. 16A or FIG. 22 are given the same reference numerals used in FIGS. 16A and 22, and description thereof is omitted. In addition to the range information of the area 2201 in which frequency f1 can be used at all of the longitudes of the coverage area 321, range information of an area 2501 in which frequency f2 can be used at all the longitudes of the coverage area 321 may be announced.

As a result, the coverage area 321 can be divided in the area 2201 in which frequency f1 can be used and the area 2501 in which frequency f2 can be used. The base station 320, for example, announces by a radio signal of frequency f1, range information that indicates that frequency f1 can be used at the latitude x1 or greater and announces by a radio signal of frequency f2, range information that indicates that frequency f2 can be used at latitudes less than the latitude x1.

Figure 26:
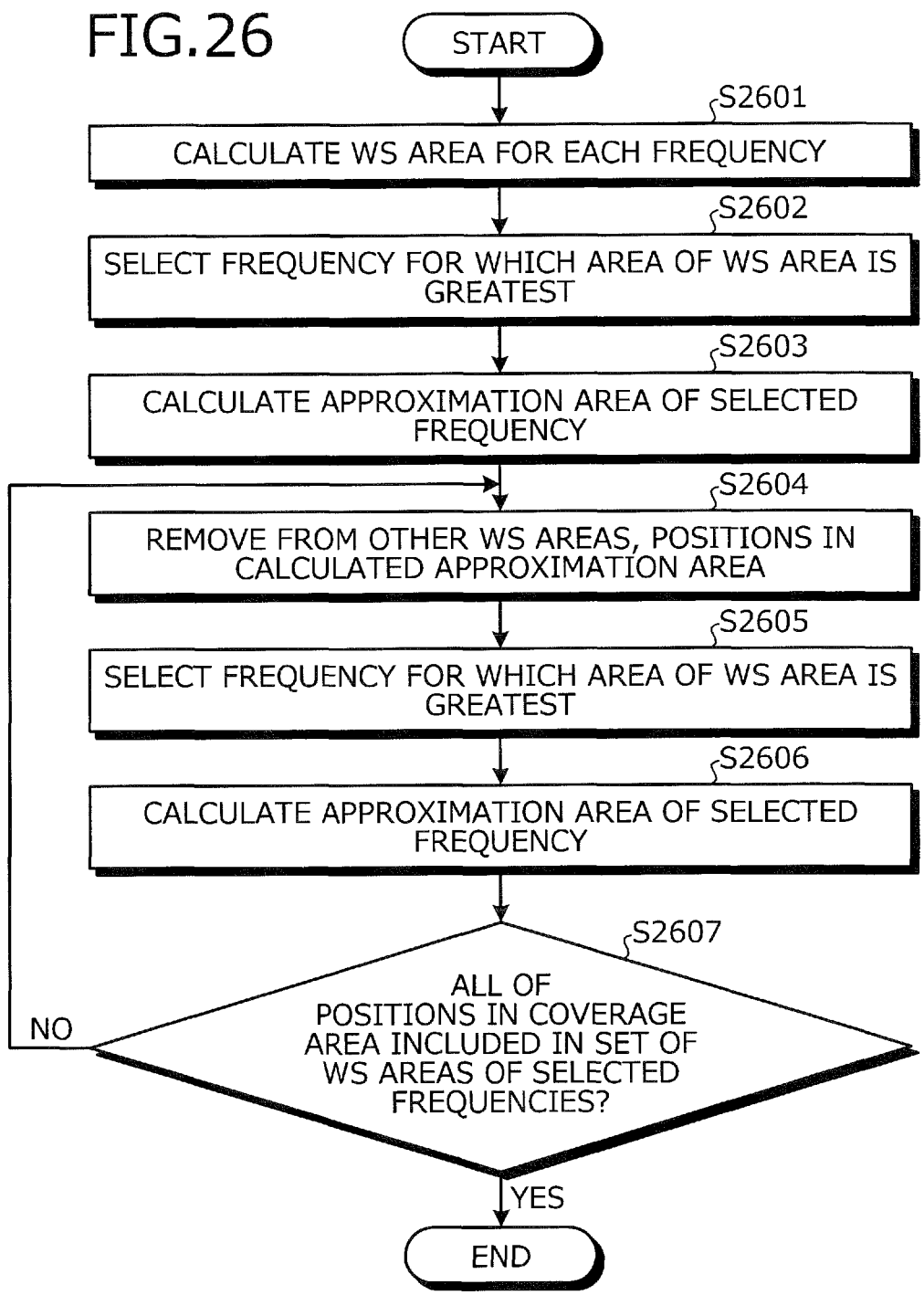
FIG. 26 is a flowchart depicting an area division process.

FIG. 26 is a flowchart depicting an area division process. The base station 320 calculates the WS area for each frequency (step S2601). The base station 320 selects from among frequencies that can be used, the frequency for which the area of the WS area calculated at step S2601 is greatest (step S2602).

The base station 320 calculates an approximation area in which the frequency selected at step S2602 can be used for wireless communication (step S2603). The base station 320 removes from the other WS areas calculated at step S2601, positions in the approximation area calculated at step S2603 (step S2604).

The base station 320 selects from among frequencies that have not been selected among the frequencies that can be used, the frequency for which the area of the WS area is greatest (step S2605). The base station 320 calculates an approximation area in which the frequency selected at step S2605 can be used for wireless communication (step S2606).

The base station 320 determines whether all of the positions in the coverage area 321 are included in a set of WS areas of the frequencies selected at step S2602 or step S2605 (step S2607). If all of the positions in the coverage area 321 are not included in the set of WS areas (step S2607: NO), the base station 320 returns to step S2604. If all of the positions in the coverage area 321 are included in the set of WS areas (step S2607: YES), the base station 320 ends a series of operations.

Figure 27:
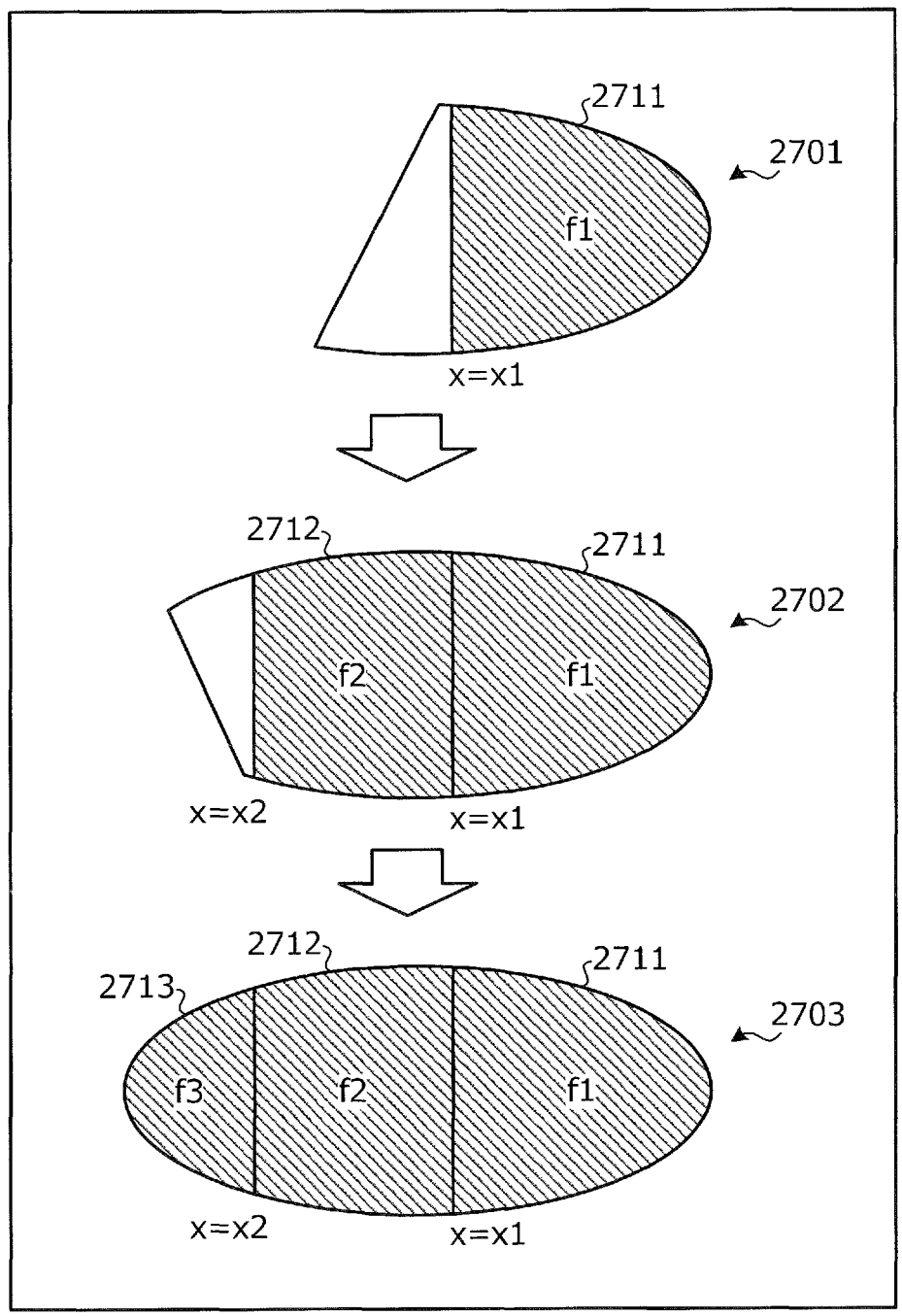
FIG. 27 is a diagram depicting an example of area division.

FIG. 27 is a diagram depicting an example of area division. The coverage area 321 is divided, for example, as depicted in FIG. 27, by the area division process depicted in FIG. 26.

At step S2601, the WS areas of frequencies f1 to fn are assumed to be calculated. Among the WS areas, the WS area of frequency f1 is assumed to be the largest, and frequency f1 is assumed to be selected at step S2602. A WS area 2711 depicted in state 2701 is the WS area of frequency f1. At step S2603, a shaded portion of the WS area 2711 is calculated as an approximation area. The minimum value of the latitude x of the shaded portion of the WS area 2711 is assumed to be x1. At step S2604, the shaded portion of the WS area 2711 is removed from the WS areas of frequencies f2 to fn.

Among the WS areas of frequencies f2 to fn, the WS area of frequency f2 is assumed to be the largest, and frequency f2 is assumed to be selected at step S2605. A WS area 2712 depicted in state 2702 is an area of the WS area of frequency f2, from which positions in the WS area 2711 have been removed. At step S2606, the shaded portion of the WS area 2712 is calculated as an approximation area. The minimum value of the latitude x of the shaded portion of the WS area 2712 is assumed to be x2. At step S2604, the shaded portion of the WS area 2712 is removed from the WS areas of frequencies f3 to fn.

Among the WS areas of frequencies f3 to fn, the WS area of frequency f3 is assumed to be the largest, and frequency f3 is assumed to be selected at step S2605. A WS area 271 depicted in state 2703 is an area of the WS area of frequency f3, from which positions in the shaded portions of the WS areas 2711 and 2712 have been removed. At step S2606, the shaded portion (entire area) of the WS area 2713 is calculated as an approximation area.

Thus, the coverage area 321 can be divided into the WS areas 2711 to 2713. More specifically, an area where the latitude x is x1 or greater in the coverage area 321 is the WS area 2711 where frequency f1 can be used. An area where the latitude x is less than x1 and x2 or greater in the coverage area 321 is the WS area 2712 where frequency f2 can be used. An area where the latitude x is less than x2 in the coverage area 321 is the WS area 2713 where frequency f3 can be used.

Figure 28:
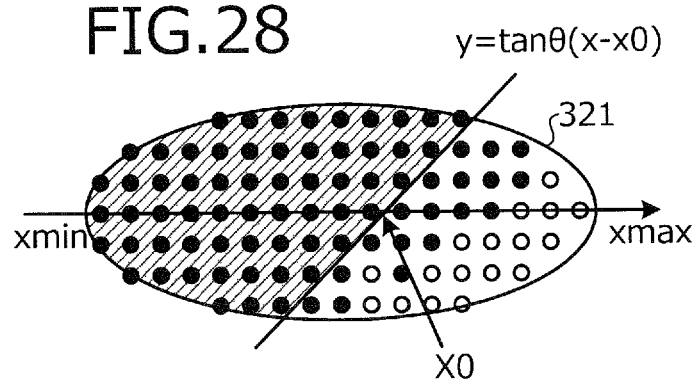
FIG. 28 is a diagram depicting another example of area division.

FIG. 28 is a diagram depicting another example of area division. In FIG. 28, white circles represent points where frequency f1 is not a WS area in the coverage area 321; black circles represent points where frequency f1 is a WS area in the coverage area 321. The base station 320 may divide the coverage area 321 at an angle as depicted in FIG. 28.

In this case, parameters included in annunciation information, for example, are x0 and θ of line y=tan θ(x−x0). More specifically, the base station 320 varies θ from 0 degrees to 360 degrees and varies x0 from the value xmin to the value xmax of the ends of the coverage area 321.

If all points encompassed by the coverage area 321 and line y=tan θ(x−x0) are a WS area, the base station 320 counts the number of points, a count N. The base station 320 calculates parameters θmax and x0max of θ and x0 maximizing the count N of the counted points, where the final form is y=tan θmax(x−x0max).

Figure 29:
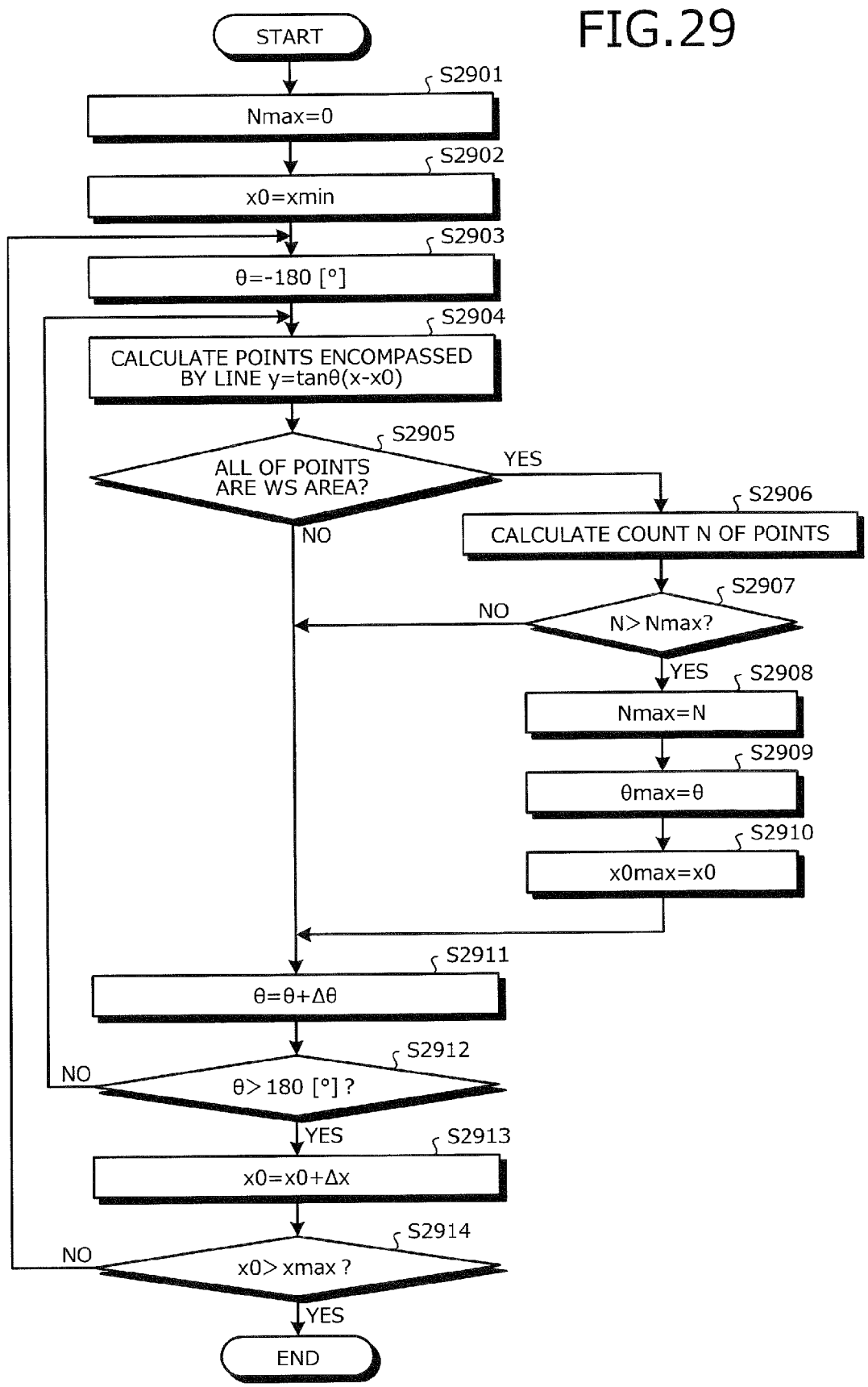
FIG. 29 is a flowchart depicting another example of the area division process.

FIG. 29 is a flowchart depicting another example of the area division process. The base station 320, for example, executes the following operations as the area division process. The base station 320 sets Nmax to zero (step S2901). The base station 320 sets x0 to the minimum value xmin of the latitude x of the coverage area 321 (step S2902).

The base station 320 sets θ to −180 [degrees] (step S2903); and calculates points encompassed by the coverage area 321 and line y=tan θ(x−x0) (step S2904). The base station 320 determines whether all of the points calculated at step S2904 are a WS area (step S2905).

At step S2905, if all of the points are a WS area (step S2905: YES), the base station 320 calculates the count N of the calculated points (step S2906). The base station 320 determines whether the count N calculated at step S2906 is greater than Nmax (step S2907).

At step S2907, if the calculated count N is not greater than Nmax (step S2907: NO), the base station 320 transitions to the operation at step S2911. If the calculated count N is greater than Nmax (step S2907: YES), the base station 320 sets the calculated count N as Nmax (step S2908); sets the current θ as θmax (step S2909); sets the current x0 as x0max (step S2910); and transitions to step S2911.

At step S2905, if all of the points are not a WS area (step S2905: NO), the base station 320 adds the unitary variation amount Δθ to the current θ (step S2911); and determines whether the current θ is greater than 180 [degrees] (step S2912). If θ is not greater than 180 [degrees] (step S2912: NO), the base station 320 returns to step S2904.

At step S2912, if θ is greater than 180 [degrees] (step S2912: YES), the base station 320 adds the unitary variation amount Δx to the current x0 (step S2913); and determines whether the current x0 is greater than xmax (step S2914). If x0 is not greater than xmax (step S2914: NO), the base station 320 returns to step S2903.

At step S2914, if x0 is greater than xmax (step S2914: YES), the base station 320 ends the series of operations. By the operations above, θ and x0 of line y=tan θ(x−x0) dividing the coverage area 321 can be calculated. The base station 320 announces by a radio signal, range information that includes the calculated θ and x0.

Thus, the communications apparatus 100, the mobile communications apparatus 200, and the communications system 300 according to the third embodiment announce by a radio signal, correspondence information that indicates approximately a range in which wireless communication is possible and thereby, enables reductions in the volume of information announced in the coverage area. A method of approximating a range in which wireless communication is possible is not limited to the described approximation method using the latitude and longitude of a range, or to the described approximation method using line y=tan θ(x−x0). For example, a range in which wireless communication is possible may be approximated by the distance from a specific point, or by a region (address, etc.).

In the third embodiment, similar to the second embodiment, a frequency that can be used at numerous positions can be selected from among usable frequencies and position information of the selected frequency can be announced in the coverage area. As a result, the volume of information announced in the coverage area can be further reduced.

Concerning the communications apparatus 100, the mobile communications apparatus 200, and the communications system 300 according to a fourth embodiment, differences from the communications apparatus 100, the mobile communications apparatus 200, and the communications system 300 according to the first to third embodiments will be described.

FIG. 30 is a diagram (part 1) depicting a configuration of the communications apparatus according to the fourth embodiment. In FIG. 3, parts identical to those depicted in FIGS. 1A and 1B are given the same reference numerals used in FIGS. 1A and 1B, and description thereof is omitted. As depicted in FIG. 30, a communications apparatus 3000 (second communications apparatus) according to the fourth embodiment includes the identifying unit 110, the obtaining unit 130, and a transmitting unit 3010. Thus, in the fourth embodiment, the identifying unit 110 and the obtaining unit 130 of the communications apparatus 100 according to the first to third embodiments may be included in the communications apparatus 3000 that differs from the communications apparatus 100.

The communications apparatus 3000, for example, is applicable to the database server 340 depicted in FIG. 3. The obtaining unit 130 outputs the obtained frequency information 131 to the transmitting unit 3010. The transmitting unit 3010 transmits to the communications apparatus 100 and based on the frequency information 131 output by the obtaining unit 130, the correspondence information 141 that correlates positions p2, . . . , pm and frequencies that can be used. In the transmission of the correspondence information 141 by the communications apparatus 3000, wireless transmission may be used, or wired transmission may be used.

The identifying unit 110 of the communications apparatus 3000, for example, may be implemented by the CPU 431 and the auxiliary memory 433 depicted in FIG. 4C. The obtaining unit 130 and the transmitting unit 3010 of the communications apparatus 3000, for example, may be implemented by the CPU 431 and the communications interface 435.

FIG. 31 is a diagram (part 2) depicting a configuration of the communications apparatus according to the fourth embodiment. In FIG. 31, parts identical to those depicted in FIGS. 1A and 1B are given the same reference numerals used in FIGS. 1A and 1B, and description thereof is omitted. As depicted in FIG. 31, the communications apparatus 100 (first communications apparatus) according to the fourth embodiment, for example, includes a receiving unit 3110 in place of the identifying unit 110 and the obtaining unit 130 depicted in FIGS. 1A and 1B. The receiving unit 3110 receives the correspondence information 141 transmitted by the communications apparatus 3000. The receiving unit 3110 outputs the received correspondence information 141 to the announcing unit 140.

The announcing unit 140 announces in the coverage area of the communications apparatus 100 and by the radio signal 142, the correspondence information 141 output by the receiving unit 3110. Thus, identification of positions in the coverage area of the communications apparatus 100 and the obtaining of the correspondence information 141 may be performed by the communications apparatus 3000, which differs from the communications apparatus 100 that announces the correspondence information 141. The receiving unit 3110, for example, may be implemented by the CPU 411 and the cabled communications interface 416 depicted in FIG. 4A.

FIG. 32 is a flowchart depicting an example of operation of the database server according to the fourth embodiment. The database server 340, for example, based on the transmission power and/or transmission antenna pattern of the base station 320 and notified by the base station 320, calculates a range of the coverage area 321 of the base station 320 (step S3201).

The database server 340, based on the range of the coverage area 321 calculated at step S3201, obtains from the database 120, frequencies that can be used at positions included in the coverage area 321 (step S3202). The database server 340, based on the frequencies obtained at step S3202, generates for each frequency, position information that indicates positions where wireless communication is possible with the mobile communications apparatus 330 (step S3203).

The database server 340 transmits to the base station 320, the position information calculated for each frequency at step S3203 (step S3204), ending a series of operations. By the operations above, the database server 340 can obtain from the database 120 and transmit to the base station 320, frequencies that can be used at positions in the coverage area 321.

FIG. 33 is a flowchart depicting an example of operation by the base station 320 according to the fourth embodiment. The base station 320, for example, executes the following operations when power is supplied to the base station 320, or when transmission power of the base station 320 changes. The base station 320 notifies the database server 340 of the transmission power of the base station 320 (step S3301). The base station 320 determines whether position information for each frequency has been received from the database server 340 (step S3302); if not, awaits receipt (step S3302: NO).

At step S3302, when position information for each frequency has been received from the database server 340 (step S3302: YES), the base station 320 begins transmission by a radio signal of the received position information (step S3303), ending a series of operations. By the operations above, the base station 320 can announce in the coverage area 321, frequencies that can be used at positions in the coverage area 321.

Thus, the communications apparatus 100 and the communications system 300 according to the fourth embodiment identification of positions in the coverage area of the communications apparatus 100 and the obtaining of correspondence information can be performed by the communications apparatus 3000, which differs from the communications apparatus 100 that announces the correspondence information 141.

Here, although a configuration has been described with respect to the first embodiment where identification of positions in the coverage area and the obtaining of correspondence information is performed by the communications apparatus 3000, in the second and third embodiments, configuration may be such that the identification of positions in the coverage area and the obtaining of correspondence information are performed by the communications apparatus 3000. For example, the selecting unit 1510 of the communications apparatus 100 according to the second embodiment may be omitted from the communications apparatus 100 and the communications apparatus 3000 may be disposed. Further, the calculating unit 2010 of the communications apparatus 100 according to the third embodiment may be omitted from the communications apparatus 100 and the communications apparatus 3000 may be disposed.

As described, the communications apparatus, the mobile communications apparatus, the communications system, and the communication method enable improved utilization efficiency of frequency.

According to one aspect of the invention, the utilization efficiency of frequency can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications apparatus comprising:
    a processor configured to:
        identify positions where and e wireless communication with a mobile communications apparatus is possible, the positions being included in a coverage area of the communications apparatus;
        obtain from a database that is inaccessible to the mobile communications apparatus, frequency information that indicates frequencies that can be used for the wireless communication at the identified positions, the frequencies not being used by a given communication system that is prioritized in using a frequency over a communication system for the wireless communication; and
        select from among the frequencies that can be used, a frequency that can be used at more of the positions where the wireless communication is possible than other frequencies among the frequencies that can be used; and
    an announcing unit configured to announce in the coverage area and by a radio signal, correspondence information that correlates the selected frequency and the positions;
    wherein the communications apparatus is configured to allow:
    the announced radio signal to be received;
    the correspondence information to be obtained;
    a position of the mobile apparatus to be identified;
    the obtained correspondence information to be searched for the frequencies that can be used and that correspond to the identified positions; and
    the wireless communication with the communications apparatus to be performed by a found frequency.

2. The communications apparatus according to claim 1, wherein
    the announcing unit announces by a radio signal of a same frequency as the frequencies that can be used, the correspondence information that indicates positions where the wireless communication is possible in the coverage area.

3. The communications apparatus according to claim 2 wherein
    the announcing unit taking each of the frequencies that can be used as a target frequency, announces by a radio signal of the target frequency, the correspondence information that indicates in the coverage area, the positions where the wireless communication is possible by the target frequency.

4. The communications apparatus according to claim 1, wherein the announcing unit announces by a radio signal, the correspondence information that indicates approximately in the coverage area, a range where the wireless communication is possible by the frequencies that can be used.

5. The communications apparatus according to claim 4, wherein the correspondence information is information that indicates in the coverage area, any one among a range of latitudes where the wireless communication is possible at each longitude, by the frequencies that can be used, and a range of longitudes where the wireless communication is possible at each latitude, by the frequencies that can be used.

6. A communications system comprising:
a communications apparatus configured to:
- identify positions where wireless communication with a mobile communications apparatus is possible, the positions being included in a coverage area of the communications apparatus;
- obtain from a database that is inaccessible to the mobile communications apparatus, frequency information that indicates frequencies that can be used for the wireless communication at the identified positions, the frequencies not being used by a given communication system that is prioritized in using a frequency over a communication system for the wireless communication; and
  - select from among the frequencies that can be used, a frequency that can be used at more of the positions where the wireless communication is possible than other frequencies among the frequencies that can be used; and
  - announce in the coverage area and by a radio signal, correspondence information that correlates the selected frequency and the positions; and a mobile communications apparatus configured to:
- receive the radio signal announced by the communications apparatus and
announced in the coverage area of the communications apparatus;
  - obtain the correspondence information from the received radio signal;
  - identify a position of the mobile communications apparatus;
  - search the obtained correspondence information, for the frequencies that can be used and that correspond to the identified positions; and
  - perform the wireless communication with the communications apparatus, by a found frequency.

* * * * *